United States Patent [19]

Seltzer et al.

[11] Patent Number: 4,590,231
[45] Date of Patent: May 20, 1986

[54] POLYOLEFIN COMPOSITIONS STABILIZED AGAINST DEGRADATION USING HYDROXYLAMINE DERIVATIVES

[75] Inventors: Raymond Seltzer, New City; Ambelal R. Patel, Ardsley; Peter W. Stewart, Yorktown Heights; Charlene White, Bronx, all of N.Y.

[73] Assignee: Ciba-Geigy Corporation, Ardsley, N.Y.

[21] Appl. No.: 633,549

[22] Filed: Jul. 23, 1984

Related U.S. Application Data

[63] Continuation-in-part of Ser. No. 540,732, Oct. 11, 1983, abandoned.

[51] Int. Cl.$^4$ ................................................. C08K 5/17
[52] U.S. Cl. ..................................... 524/100; 524/101; 524/120; 524/126; 524/236; 524/291; 524/399
[58] Field of Search ............... 524/236, 399, 100, 101, 524/291, 120; 525/380; 564/299, 301; 252/403; 204/159.2

[56] References Cited

U.S. PATENT DOCUMENTS

| | | | |
|---|---|---|---|
| 3,408,422 | 10/1968 | May | 260/837 |
| 3,432,578 | 3/1969 | Martin | 525/314 |
| 3,644,278 | 2/1973 | Klemchuk | 260/458 |
| 3,778,464 | 12/1973 | Klemchuk | 260/482 |
| 3,869,278 | 3/1975 | Wilcox | 564/301 |
| 3,926,909 | 12/1975 | Wei | 524/217 |
| 4,242,224 | 12/1980 | Dean et al. | 524/255 |
| 4,316,996 | 2/1982 | Collonge et al. | 568/784 |
| 4,386,224 | 5/1983 | Deetman | 568/703 |
| 4,396,735 | 8/1983 | Minagawa et al. | 524/100 |
| 4,404,302 | 9/1983 | Gupta et al. | 524/100 |

OTHER PUBLICATIONS

L. Mascia: *The Role of Additives in Plastics,* (1974) pp. 16–43.
F. Mitterhofer–Polymer Engineering and Science, (Mid Jul. 1980) vol. 20, No. 10, pp. 692–694.
Daryl K. C. Hodgeman–J. Polymer Science, Polymer Chem. Ed., vol. 19, 807–818 (1981).

*Primary Examiner*—Veronica P. Hoke
*Attorney, Agent, or Firm*—Luther A. R. Hall

[57] ABSTRACT

N,N-Dibenzylhydroxylamine and other selected hydroxylamine derivatives are effective in stabilizing polyolefin compositions containing a stabilizer or mixture of stabilizers selected from the group consisting of the phenolic antioxidants, the hindered amine light stabilizers, the ultraviolet light absorbers, the organic phosphorus compounds, the alkaline metal salts of fatty acids and the thiosynergists, against degradation upon high temperature extrusion, exposure to the combustion products of natural gas, gamma irradiation or upon storage for extended periods.

17 Claims, No Drawings

POLYOLEFIN COMPOSITIONS STABILIZED AGAINST DEGRADATION USING HYDROXYLAMINE DERIVATIVES This is a continuation-in-part of application Ser. No. 540,732, filed on Oct. 11, 1983 now abandoned.

BACKGROUND OF THE INVENTION

The present invention pertains to polyolefin compositions containing a stabilizer or mixture of stabilizers selected from the group consisting of the phenolic antioxidants, the hindered amine light stabilizers, the ultraviolet light absorbers, the organic phosphorus compounds, the alkaline metal salts of fatty acids and the thiosynergists, which are stabilized against degradation and/or discoloration by an effective amount of N,N-dibenzylhydroxylamine or other selected hydroxylamine derivative.

Although phenolic antioxidants have long been known to be very effective stabilizers for polyolefins and have enjoyed wide commercial success for that use, polyolefin compositions stabilized with phenolic antioxidants tend to discolor upon heating at elevated temperatures for prolonged periods or upon exposure to the combustion products of natural gas.

While the concomitant addition of organic phosphites to such polyolefin compositions mitigates the discoloration, it remains a serious practical problem.

Likewise polyolefin compositions containing certain phenolic antioxidants and hindered amine light stabilizers tend to discolor upon storage for extended periods even at ambient temperatures.

The organic hydroxylamine compounds, such as N,N-dibenzylhydroxylamine, are generally known and some are commercially available.

U.S. Pat. Nos. 3,644,278 and 3,778,464 describe the use of substituted hydroxylamines of varying structures as antioxidant stabilizers for hydrocarbons including polyolefins. The use of such substituted hydroxylamines in polyolefins in combination with a phenolic antioxidant or in combination with an organic phosphorus compound, an ultraviolet light absorber, a thiosynergist or a hindered amine light stabilizer with the resulting resistance to degradation and/or discoloration is not disclosed or suggested.

U.S. Pat. No. 3,408,422 discloses the use of selected hydroxylamine derivatives in unsaturated polyester compositions to prevent premature gelation on storage.

U.S. Pat. No. 3,926,909 describes the use of substituted hydroxylamines as stabilizers to prevent the discoloration of polyurethanes (spandex) upon exposure to light, smog or gas fumes.

U.S. Pat. No. 4,242,224 discloses that the pink discoloration which occurs in the amine antioxidant and antiozonant emulsions used in the latex industry at high pH values can be prevented or retarded by the use of dialkylhydroxylamine or mercaptan stabilizers.

U.S. Pat. No. 4,316,996 pertains to a process of preparing phenolic antioxidants in the presence of a hydroxylamine derivative and of a substituted oxime to yield a phenolic antioxidant which itself exhibits improved color and color stability. It is stated that, when such antioxidants are incorporated into rubber, the amount and rate of discoloration is reduced. The instant compositions are not disclosed or suggested.

U.S. Pat. No. 3,432,578 relates to conjugated diene polymer compositions stabilized against the adverse effects of ultraviolet light by use of diaryl or diaralkyl hydroxylamine compounds including N,N-dibenzylhydroxylamine. It is noted that the dialkylhydroxylamines are completely ineffective in stabilizing such polymer compositions. This patent mentions that other stabilizers may be used in conjunction with the hydroxylamine derivative and in Table I discloses stabilized compositions consisting of a conjugated diene polymer, phenolic antioxidants and N,N-dibenzylhydroxylamine. Such compositions were resistant to decomposition upon ultraviolet exposure.

U.S. Pat. No. 4,386,224 discloses the use of N,N-diethylhydroxylamine as a color stabilizer for monoalkyl phenols such as nonyl or dodecyl phenol.

OBJECTS OF THE INVENTION

The broad object of the instant invention is to provide a polyolefin composition, stabilized against degradation, which contains a stabilizer or mixture of stabilizers selected from the group consisting of the phenolic antioxidants, the hindered amine light stabilizers, the ultraviolet light absorbers, the organic phosphorus compounds and the thiosynergists, which also contain a hydroxylamine derivative.

An object of the present invention is to provide a stabilized polyolefin composition containing a phenolic antioxidant which is stabilized against discoloration upon exposure to heating or to the combustion products of natural gas by the concomitant presence of a hydroxylamine derivative.

A further object of the instant invention is to provide a stabilized polyolefin composition containing a phenolic antioxidant and an organic phosphorus compound which is stabilized against discoloration upon exposure to heating or to the combustion products of natural gas by the concomitant presence of a hydroxylamine derivative.

Still another object of the present invention is to provide a stabilized polyolefin composition containing an alkaline metal salt of a fatty acid or said metal salt and a phenolic antioxidant which is stabilized against discoloration upon exposure to heating or to the combustion products of natural gas by the concomitant presence of a hydroxylamine derivative.

Another object of the present invention is to provide a stabilized polyolefin composition containing a phenolic antioxidant and a hindered amine light stabilizer which is stabilized against discoloration upon exposure to heating, to the combustion products of natural gas or to storage for prolonged periods at ambient temperatures by the concomitant presence of a hydroxylamine derivative.

Another object of the present invention is to provide a stabilized polyolefin composition containing a phenolic antioxidant and an ultraviolet light absorber which is stabilized against discoloration upon exposure to heating, to the combustion products of natural gas or to storage for prolonged periods at ambient temperatures by the concomitant presence of a hydroxylamine derivative.

An object of the present invention is to provide a stabilized polyolefin composition containing a phenolic antioxidant, an ultraviolet light absorber and an organic phosphorus compound which is stabilized against discoloration upon exposure to heating or to the combustion products of natural gas by the concomitant presence of a hydroxylamine derivative.

A further object of the instant invention is to provide a stabilized polyolefin composition containing a phenolic antioxidant, a hindered amine light stabilizer and an organic phosphorus compound which is stabilized against discoloration upon exposure to heating or to the combustion products of natural gas by the concomitant presence of a hydroxylamine derivative.

Still another object of the present invention is to provide a stabilized polyolefin composition containing a phenolic antioxidant, an ultraviolet light absorber and a hindered amine light stabilizer which is stabilized against discoloration upon exposure to heating, to the combustion products of natural gas or to storage for prolonged periods at ambient temperatures by the concomitant presence of a hydroxylamine derivative.

A further object of the instant invention is to provide a stabilized polyolefin composition containing a phenolic antioxidant, a hindered amine light stabilizer, an organic phosphorus compound and a thiosynergist which is stabilized against discoloration upon exposure to heating or to the combustion products of natural gas by the concomitant presence of a hydroxylamine derivative.

Still another object of the present invention is to provide a stabilized polyolefin composition containing a hindered amine light stabilizer which is stabilized against discoloration upon exposure to heating, to the combustion products of natural gas or to storage for prolonged periods at ambient temperatures by the concomitant presence of a hydroxylamine derivative.

A further object of the instant invention is to provide a stabilized polyolefin composition containing a phenolic antioxidant, and a thiosynergist which is stabilized against discoloration upon exposure to heating or to the combustion products of natural gas by the concomitant presence of a hydroxylamine derivative.

DETAILED DISCLOSURE

This invention pertains to a composition, stabilized against degradation, which comprises
(a) a saturated polyolefin or mixture thereof,
(b) a stabilizing amount of a stabilizer or mixture of stabilizers selected from the group consisting of the phenolic antioxidants, the hindered amine light stabilizers, the ultraviolet light absorbers, the organic phosphorus compounds, the alkaline metal salts of fatty acids and the thiosynergists, and
(c) a stabilizing amount of a hydroxylamine derivative, or a mixture thereof, containing the group

The instant composition is stabilized against degradation and/or discoloration upon exposure to heating at elevated temperatures, to the combustion products of natural gas, to gamma irradiation or to prolonged storage at ambient temperature.

More particularly the instant invention relates to a stabilized composition wherein the hydroxylamine derivative is one of formula I to XIV

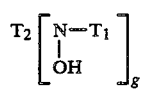 (I)

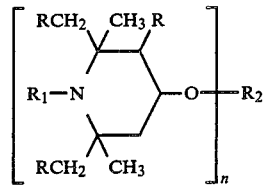 (II)

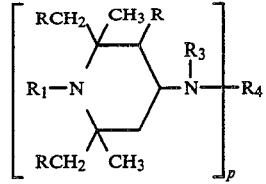 (III)

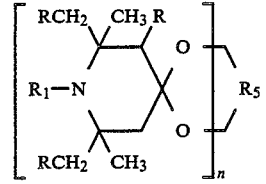 (IV)

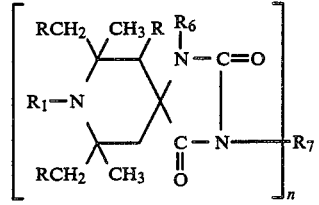 (V)

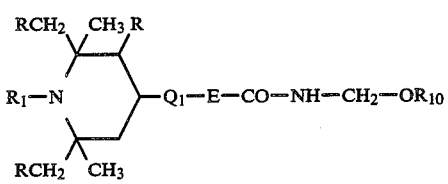 (VI)

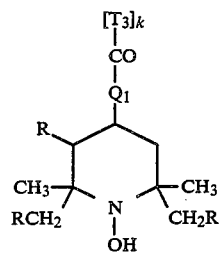 (VII)

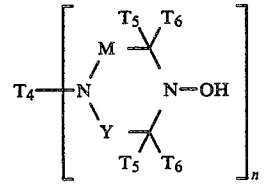 (VIII)

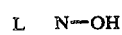 (IX)

-continued

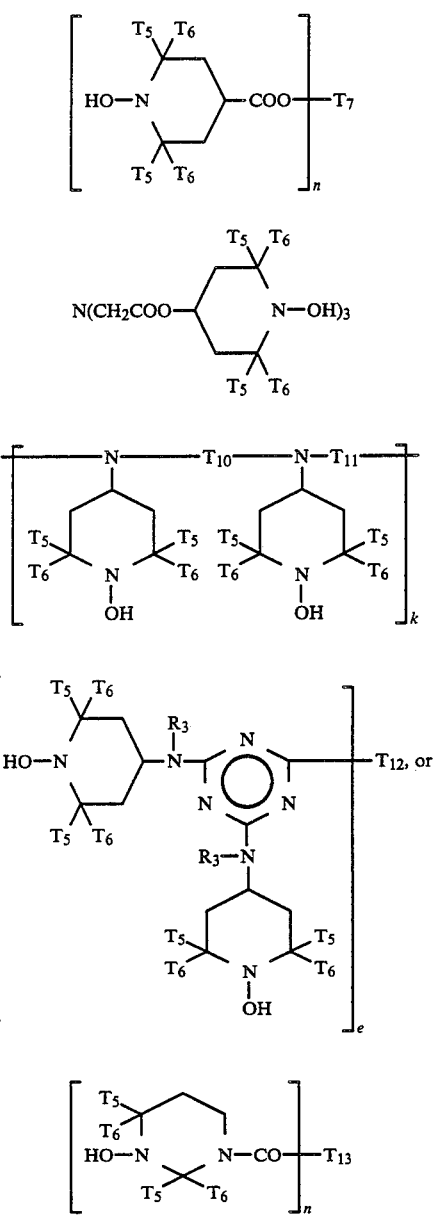

(X)

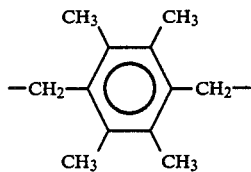

when g is 3,
T₂ is alkanetriyl of 3 to 6 carbon atoms, or (XI)

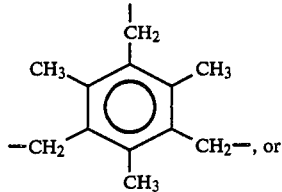

when g is 4,
T₂ is alkanetetrayl of 4 to 6 carbon atoms;
R is hydrogen or methyl,
n is 1 or 2,
$R_1$ is hydroxyl,
when n is 1,
$R_2$ is hydrogen, $C_1$–$C_{18}$ alkyl optionally interrupted by one or more oxygen atom, cyanoethyl, benzyl, glycidyl, a monovalent acyl radical of an aliphatic, cycloaliphatic, araliphatic or aromatic carboxylic acid, or of carbamic acid or of a phosphorus-containing acid, or a monovalent silyl radioal, preferably an acyl radical of an aliphatic carboxylic acid having 2–18 C atoms, of a cycloaliphatic carboxylic acid having 5–12 C atoms or of an aromatic carboxylic acid having 7–15 C atoms, or
when n is 2,
$R_2$ is $C_1$–$C_{12}$ alkylene, $C_4$–$C_{12}$ alkenylene, xylylene, a divalent acyl radical of an aliphatic, cycloaliphatic, araliphatic or aromatic dicarboxylic acid, of a dicarbamic acid or of a phosphorus-containing acid, or a bivalent silyl radioal, preferably an acyl radical of an aliphatic dicarboxylic acid having 2–36 C atoms, of a cycloaliphatic or aromatic dicarboxylic acid having 8–14 C atoms, or of an aliphatic, cycloaliphatic or aromatic dicarbamic acid having 8–14 C atoms;
p is 1, 2 or 3,
$R_3$ is hydrogen, $C_1$–$C_{12}$ alkyl, $C_5$–$C_7$ cycloalkyl, $C_7$–$C_8$ aralkyl, $C_2$–$C_{18}$ alkanoyl, $C_3$–$C_5$ alkenoyl or benzoyl;
when p is 1,
$R_4$ is hydrogen, $C_1$–$C_{18}$ alkyl, $C_5$–$C_7$ cycloalkyl, $C_2$–$C_8$ alkenyl unsubstituted or substituted by a cyano, carbonyl or carbamide group, or it is glycidyl, a group of the formula —CH₂—CH(OH)—Z or of the formula —CONH—Z wherein Z is hydrogen, methyl or phenyl; or
when p is 2,
$R_4$ is $C_2$–$C_{12}$ alkylene, $C_6$–$C_{12}$ arylene, xylylene, a —CH₂CH(OH)—CH₂ group, or a group —CH₂—CH(OH)—CH₂—O—X—O—CH₂—CH(OH)—CH₂— wherein X is $C_2$–$C_{10}$ alkylene, $C_6$–$C_{15}$ arylene or $C_6$–$C_{12}$ cycloalkylene; or, provided that $R_3$ is not alkanoyl, alkenoyl or benzoyl, $R_4$ can also be a divalent acyl radical of an aliphatic, cycloaliwherein
$T_1$ is alkyl of 1 to 36 carbon atoms, cycloalkyl of 5 to 12 carbon atoms, aralkyl of 7 to 9 carbon atoms, or said aralkyl substituted by alkyl of 1 to 4 carbon atoms or by one or two halogen atoms,
g is 1, 2, 3 or 4,
when g is 1,
$T_2$ is hydrogen, or independently has the same meaning as $T_1$;
when g is 2,
$T_2$ is alkylene of 2 to 12 carbon atoms, cycloalkylene of 6 to 10 carbon atoms, arylene of 6 to 10 carbon atoms, alkylenearylenealkylene of 8 to 10 carbon atoms, or phatic or aromatic dicarhoxylic acid or dicarbamic acid, or can be the group —CO—; or $R_3$ and $R_4$ together when p is 1 can be the cyclic acyl radical of an aliphatic or aromatic 1,2- or 1,3-dicarboxylic acid, or $R_4$ is

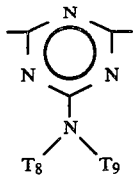

where $T_8$ and $T_9$ are independently hydrogen, alkyl of 1 to 18 carbon atoms, or $T_8$ and $T_9$ together are alkylene of 4 to 6 carbon atoms or 3-oxapentamethylene, preferably $T_8$ and $T_9$ together are 3-oxapentamethylene;

when p is 3,
$R_4$ is 2,4,6-triazinyl,
when n is 1,
$R_5$ is $C_2$-$C_8$ alkylene or hydroxyalkylene or $C_4$-$C_{22}$ acyloxyalkylene; or
when n is 2
$R_5$ is $(-CH_2)_2C(CH_2-)_2$;
$R_6$ is hydrogen, $C_1$-$C_{12}$ alkyl, allyl, benzyl, glycidyl or $C_2$-$C_6$ alkoxyalkyl;
when n is 1
$R_7$ is hydrogen, $C_1$-$C_{12}$ alkyl, $C_3$-$C_5$ alkenyl, $C_7$-$C_9$ aralkyl, $C_5$-$C_7$ cycloalkyl, $C_2$-$C_4$ hydroxyalkyl, $C_2$-$C_6$ alkoxyalkyl, $C_6$-$C_{10}$ aryl, glycidyl, a group of the formula $-(CH_2)_m-COO-Q$ or of the formula $-(CH_2)_m-O-CO-Q$ wherein m is 1 or 2, and Q is $C_1$-$C_4$ alkyl or phenyl; or
when n is 2,
$R_7$ is $C_2$-$C_{12}$ alkylene, $C_6$-$C_{12}$ arylene, a group $-CH_2CH(OH)-CH_2-O-X-O-CH_2-CH(OH)-CH_2-$ wherein X is $C_2$-$C_{10}$ alkylene, $C_6$-$C_{15}$ arylene or $C_6$-$C_{12}$ cycloalkylene, or a group $-CH_2CH(OZ')CH_2-(OCH_2-CH(OZ')CH_2)_2-$ wherein Z' is hydrogen, $C_1$-$C_{18}$ alkyl, allyl, benzyl, $C_2$-$C_{12}$ alkanoyl or benzoyl;
$Q_1$ is $-N(R_8)-$ or $-O-$; E is $C_1$-$C_3$ alkylene, the group $-CH_2-CH(R_9)-O-$ wherein $R_9$ is hydrogen, methyl or phenyl, the group $-(CH_2)_3-NH-$ or a direct bond;
$R_{10}$ is hydrogen or $C_1$-$C_{18}$ alkyl, $R_8$ is hydrogen, $C_1$-$C_{18}$ alkyl, $C_5$-$C_7$ cycloalkyl, $C_7$-$C_{12}$ aralkyl, cyanoethyl, $C_6$-$C_{10}$ aryl, the group $-CH_2-CH(R_9)-OH$ wherein $R_9$ has the meaning defined above; a group of the formula

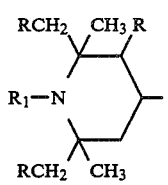

or a group of the formula

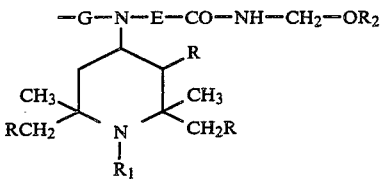

wherein G can be $C_2$-$C_6$ alkylene or $C_6$-$C_{12}$ arylene; or $R_8$ is a group $-E-CO-NH-CH_2-OR_{10}$;

Formula VII denotes a recurring structural unit of a polymer where $T_3$ is ethylene or 1,2-propylene, or is the repeating structural unit derived from an alpha-olefin copolymer with an alkyl acrylate or methacrylate; preferably a copolymer of ethylene and ethyl acrylate, and where k is 2 to 100;

$T_4$ has the same meaning as $R_4$ when p is 1 or 2,
$T_5$ is methyl,
$T_6$ is methyl or ethyl, or $T_5$ and $T_6$ together are tetramethylene or pentamethylene or mixture of said hydroxyamine derivatives, preferably $T_5$ and $T_6$ are each methyl,
M and Y are independently methylene or carbonyl, preferably m is methylene and Y is carbonyl, and $T_4$ is ethylene where n is 2;
L denotes straight or branched chain alkylene of 4 to 7 carbon atoms, 3-oxapentamethylene or 3-hydroxyazapentamethylene;
$T_7$ is the same as $R_7$, and $T_7$ is preferably octamethylene where n is 2,
$T_{10}$ and $T_{11}$ are independently alkylene of 2 to 12 carbon atoms, or $T_{11}$ is

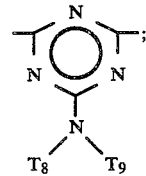

$T_{12}$ is

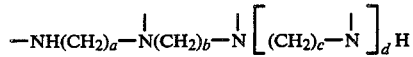

where a, b and c are independently 2 or 3, and d is 0 or 1, preferably a and c are each 3, b is 2 and d is 1; and e is 3 or 4, preferably 4; and $T_{13}$ is the same as $R_2$ with the proviso that $T_{13}$ cannot be hydrogen when n is 1.

More particularly, the instant invention pertains to a stabilized composition wherein component (b) is 1. a stabilizing amount of a phenolic antioxidant or mixture thereof; or
2. a stabilizing amount of a phenolic antioxidant or mixture thereof in combination with a stabilizing amount of A. an organic phosphorus compound or mixture thereof; or
B. a hindered amine light stabilizer or mixture thereof; or
C. a thiosynergist or mixture thereof; or
D. an ultraviolet light absorber or mixture thereof; or E. a hindered amine light stabilizer and an organic phosphorus compound or mixtures thereof; or F. a hindered amine light stabilizer, a thiosynergist and an organic phosphorus compound or mixtures thereof; or G. an ultraviolet light absorber and a hindered amine light stabilizer or mixtures thereof; or H. an ultraviolet light absorber and an organic phosphorus compound or mixtures thereof; or I. an alkaline metal salt of a fatty acid or mixture thereof;

3. a stabilizing amount of a hindered amine light stabilizer or mixture thereof; or 4. a stabilizing amount of an alkaline metal salt of a fatty acid or mixture thereof.

The hydroxylamine derivatives useful in the instant invention are denoted by the various structures of formulas I to XIII. Some of these hydroxylamine derivatives are known compounds and many are commercially available. In other cases the requisite amine intermediates are commercially available.

The hydroxylamine may generally be prepared by reacting hydroxylamine or a substituted hydroxylamine with an activated halogen compound in the presence of an acid acceptor; or by the oxidizing an amine with a peroxy compound such as hydrogen peroxide followed by reduction of the oxyl intermediate formed to the desired hydroxylamine derivative; or by reducing the oxime of a cyclic ketone to the corresponding hydroxylamine.

When the hydroxylamine derivative is of formula I, $T_1$ may be alkyl of 1 to 36 carbon atoms such as methyl, ethyl, isobutyl, tert-butyl, n-octyl, n-dodecyl, or n-octadecyl. preferably $T_1$ is alkyl of 4 to 18 carbon atoms.

$T_1$ may also be cycloalkyl of 5 to 12 carbon atoms such as cyclopentyl, cyclohexyl, cyclooctyl or cyclododecyl. Preferably $T_1$ is cyclohexyl or cyclododecyl. $T_1$ is also aralkyl of 7 to 9 carbon atoms such as benzyl, alpha-methylbenzyl, or alpha, alpha-dimethylbenzyl where the benzyl group may additionally be substituted by alkyl, preferably methyl, or by one or two halogen groups, preferably chloro or bromo.

Preferably $T_1$ is benzyl.

In formula I, g is 1, 2, 3 or 4. Preferably g is 1 or 2, most preferably 1.

When g is 1, $T_2$ is hydrogen or independently has the same meaning as $T_1$

Preferably $T_1$ and $T_2$ together have a carbon content of 6 to 36 carbon atoms.

Most preferably, $T_2$ is hydrogen and $T_1$ is cycloalkyl of 6 to 12 carbon atoms; or $T_1$ and $T_2$ are the same and each are alkyl of 4 to 18 carbon atoms, cyclohexyl or benzyl.

Particularly preferred embodiments of the compounds of formula I are N,N-di-tert-butylhydroxylamine, N,N-di-n-octylhydroxylamine, N-cyclohexylhydroxylamine, N-cyclododecylhydroxylamine, N,N-dicyclohexylhydroxylamine and N,N-dibenzylhydroxylamine, or a mixture thereof.

When g is 2, $T_2$ is alkylene of 2 to 12 carbon atoms such as ethylene, 1,2-propylene, trimethylene, tetramethylene, hexamethylene, octamethylene or dodecamethylene. Preferably $T_2$ is alkylene of 2 to 8 carbon atoms.

$T_2$ is also cycloalkylene of 6 to 10 carbon atoms such as cyclohexylene, preferably 1,4-cyclohexylene, or decahydronaphthylene.

$T_2$ can also be arylene of 6 to 10 carbon atoms such as o-, m- or p-phenylene, preferably m- or p-phenylene, or 1,4-naphthylene.

$T_2$ is also alkylenearylenealkylene of 8 to 10 carbon atoms, such as p-xylylene or ethylene-p-phenyleneethylene. Preferably $T_2$ is p-xylylene or

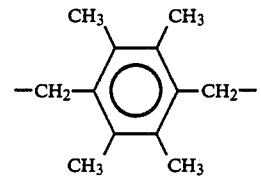

When g is 3, $T_2$ is alkanetriyl of 3 to 6 carbon atoms such as glyceryl; or preferably

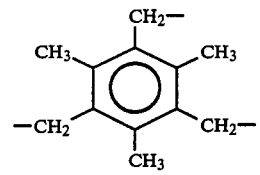

When g is 4, $T_2$ is alkanetetrayl of 4 to 6 carbon atoms, such as $(-CH_2)_2C(CH_2-)_2$ or 1,2,3,4-butanetetrayl.

When the hydroxylamine is of formula II to VII, R is hydrogen or methyl, preferably hydrogen.

If any substituents are $C_1-C_{12}$ alkyl, they are for example methyl, ethyl, n-propyl, n-butyl, sec-butyl, tert-butyl, n-hexyl, n-octyl, 2-ethylhexyl, n-nonyl, n-decyl, n-undecyl or n-dodecyl.

As $C_1-C_{18}$ alkyl, $R_2$ can be for example the groups given above, and in addition for example n-tridecyl, n-tetradecyl, n-hexadecyl or n-octadecyl.

If $R_2$ is a monovalent acyl radical of a carboxylic acid, it is for example an acyl radical of acetic acid, stearic acid, salicylic acid, methacrylic acid, maleic acid, benzoic acid or β-(3,5-di-tert-butyl-4-hydroxyphenyl)-propionic acid.

If $R_2$ is a divalent acyl radical of a dicarboxylic acid, it is for example an acyl radical of adipic acid, suberic acid, sebacic acid, phthalic acid, dibutylmalonic acid, dibenzylmalonic acid orbutyl-(3,5-di-tert-butyl-4-hydroxybenzyl)-malonic acid, or bicycloheptenedicarboxylic acid.

If $R_2$ is a divalent acyl radical of a dicarbamic acid, it is for example an acyl radical of hexamethylenedicarbamic acid or of 2,4-toluylenedicarbamic acid.

The following compounds are examples of polyalkylpiperidine starting materials useful in making the hydroxylamine derivatives of formula II.

4-hydroxy-2,2,6,6-tetramethylpiperidine, 4-stearoyloxy-2,2,6,6-tetramethylpiperidine, (di-2,2,6,6-tetramethylpiperidine-4-yl) adipate (di-2,2,6,6-tetramethylpiperidine-4-yl) sebacate, dimethyl-bis-(2,2,6,6-tetramethylpiperidine-4-oxy)-silane.

If any substituents are $C_5-C_7$ cycloalkyl, they are in particular cyclohexyl.

As $C_7-C_8$ aralkyl, $R_3$ is particularly phenethyl or above all benzyl.

As $C_2$–$C_{18}$ alkanoyl, $R_3$ for example propionyl, butyryl, octanoyl, dodecanoyl, hexadecanoyl, octadecanoyl, but preferably acetyl; and as $C_3$–$C_5$ alkenoyl, $R_3$ is in particular acryloyl.

If $R_4$ is $C_2$–$C_8$ alkenyl unsubstituted or substituted by a cyano, carbonyl or carbamide group, it is for example 1-propenyl, allyl, methallyl, 2-butenyl, 2-pentenyl, 2-hexenyl, 2-octenyl, 2,2-dicyanovinyl, 1-methyl-2-cyano-2-methoxycarbonyl-vinyl or 2,2-diacetylaminovinyl.

If any substituents are $C_2$–$C_{12}$ alkylene, they are for example ethylene, propylene, 2,2-dimethylpropylene, tetramethylene, hexamethylene, octamethylene, decamethylene or dodecamethylene.

If any substituents are $C_6$–$C_{15}$ arylene, they are for example o-, m- or p-phenylene, 1,4-naphthylene or 4,4'-diphenylene.

As $C_6$–$C_{12}$ cycloalkylene, X is especially cyclohexylene.

The following compounds are examples of polyalkylpiperidine starting materials useful in making the hydroxylamine derivatives of formula III.

N,N'-bis-(2,2,6,6-tetramethylpiperidin-4-yl)-hexamethylene-1,6-diamine,
N,N'-bis-(2,2,6,6-tetramethylpiperidin-4-yl)-hexamethylene-1 6-diacetamide,
4-benzylamino-2,2,6,6-tetramethylpiperidine,
N,N'-bis-(2,2,6,6-tetramethylpiperidin-4-yl)-N,N'-dibutyl-adipamide,
N,N'-bis-(2,2,6,6-tetramthylpiperidin-4-yl)-N,N'-dicyclohexyl-(2-hydroxypropylene),
N,N'-bis-(2,2,6,6-tetramethylpiperidin-4-yl)-p-xylylenediamine,
4-(3-methyl-4-hydroxy-5-tert-butyl-benzoic acetamido)-2,2,6,6-tetramethylpiperidine,
alpha-cyano-β-methyl-β-[N-(2,2,6,6-tetramethylpiperidin-4-yl]-amino-acrylic acid methyl ester.

If $R_5$ is $C_2$–$C_8$ alkylene or hydroxyalkylene, it is for example ethylene, 1-methyl-ethylene, propylene, 2-ethylpropylene or 2-ethyl-2-hydroxymethylpropylene.

As $C_4$–$C_{22}$ acyloxyalkylene, $R_5$ is for example 2-ethyl-2-acetoxymethyl-propylene.

The following compounds are examples of polyalkylpiperidine starting materials useful in making the hydroxylamine derivatives of formula IV.
9-aza-8,8,10,10-tetramethyl-1,5-dioxaspiro[5.5]undecane,
9-aza-8,8,10,10-tetramethyl-3-ethyl-1,5-dioxaspiro[5.5]undecane,
2,2,6,6-tetramethylpiperidine-4-spiro-2'-(1',3'-dioxane)5'-spiro-5''-(1'', 3'''-dioxane)-2''-spiro-4'''-(2''',2''',-6''', 6'''-tetramethylpiperidine).

If any substituents are $C_2$–$C_6$ alkoxyalkyl, they are for example methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

If $R_7$ is $C_3$–$C_5$ alkenyl, it is for example 1-propenyl, allyl, methallyl, 2-butenyl or 2-pentenyl.

As $C_7$–$C_9$ aralkyl, $R_7$ is in particular phenethyl or above all benzyl; and as $C_5$–$C_7$ cycloalkyl, $R_7$ is especially cyclohexyl.

If $R_7$ is $C_2$–$C_4$ hydroxyalkyl, it is for example 2-hydroxyethyl, 2-hydroxypropyl, 3-hydroxypropyl, 2-hydroxybutyl or 4-hydroxybutyl.

As $C_6$–$C_{10}$ aryl, $R_7$ is in particular phenyl, or alpha- or β-naphthyl which is unsubstituted or substituted by halogen or $C_1$–$C_4$ alkyl.

If $R_7$ is $C_2$–$C_{12}$ alkylene, it is for example ethylene, propylene, 2,2-dimethylpropylene, tetramethylene, hexamethylene, octamethylene, decamethylene or dodecamethylene.

If $R_7$ is $C_6$–$C_{12}$ arylene, it is for example o-, m- or p-phenylene, 1,4-naphthylene or 4,4'-diphenylene.

If Z' is $C_2$–$C_{12}$ alkanoyl, it is for example propionyl, butyryl, octanoyl, dodecanoyl or preferably acetyl.

The following compounds are examples of polyalkylpiperidine starting materials useful in making hydroxylamine derivatives of formula V.
3-benzyl-1,3,8-triaza-7,7,9,9-tetramethylspiro[4.5]-decane-2,4-dione,
3-n-octyl-1,3,8-triaza-7,7,9,9-tetramethylspiro[4.5]-decane-2,4-dione,
3-allyl-1,3,8-triaza-1,7,7,9,9-pentamethylspiro[4.5]-decane-2,4-dione, or the compounds of the following formulae:

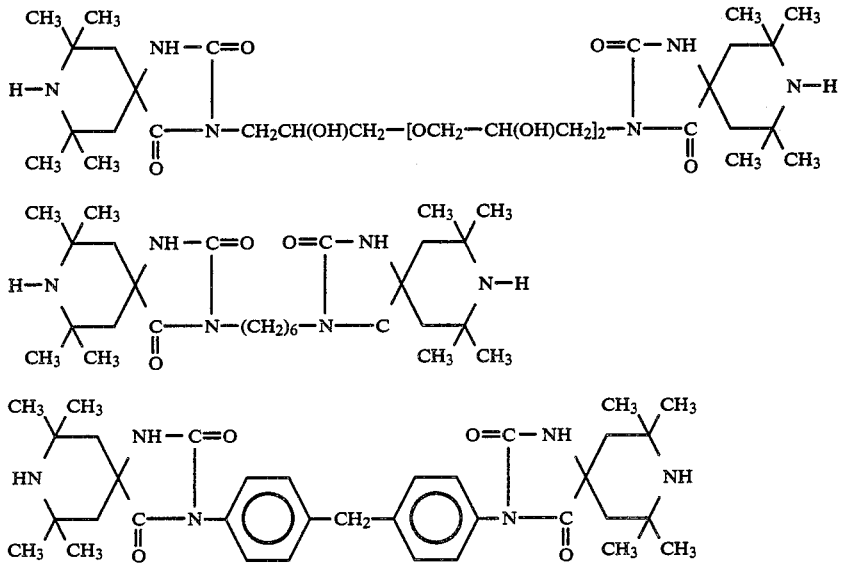

As $C_5$-$C_7$ cycloalkyl, $R_8$ is in particular cyclohexyl.

As $C_6$-$C_{10}$ aryl, $R_8$ is particularly phenyl, or alpha-or β-naphthyl which is unsubstituted or substituted with halogen or $C_1$-$C_4$ alkyl. As $C_1$-$C_3$ alkylene, E is for example methylene, ethylene or propylene.

As $C_2$-$C_6$ alkylene, G is for example ethylene, propylene, 2,2-dimethylpropylene, tetramethylene or hexamethylene; and as $C_6$-$C_{12}$ arylene, G is o-, m- or p-phenylene, 1,4-naphthylene or 4,4'-diphenylene.

The following compounds are examples of polyalkylpiperidine starting materials useful in making the hydroxylamine derivatives of formula VI.

N-hydroxymethyl-N'-2,2,6,6-tetramethylpiperidin-4-yl-urea,

N-methoxymethyl-N'-2,2,6,6-tetramethylpiperidin-4-yl-urea,

N-methoxymethyl-N'-n-dodecyl-N'-2,2,6,6-tetramethylpiperidin-4-yl-urea, and

O-(2,2,6,6-tetramethylpiperidin-4-yl)-N-methoxymethylurethane.

When the instant hydroxylamine derivative is of formula VII, the following polymeric compounds are examples of starting materials useful in preparing said derivatives.

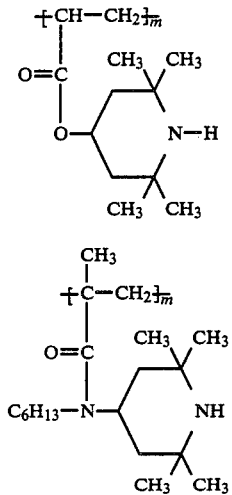

When the hydroxylamine is of formula IX, L may be tetramethylene, pentamethylene, hexamethylene, heptamethylene, 2,6-heptanediyl, 2,4-dimethyl-1,5-pentanediyl, 3-oxapentamethylene or 3-hydroxyazapentamethylene. Preferably L is pentamethylene or 3-oxapentamethylene.

The most preferred hydroxylamine derivatives of the instant invention are those of formula I.

The saturated polyolefins useful in the instant compositions are the polymers, derived from monoolefins, such as polyethylene, which can optionally be crosslinked, polypropylene, polyisobutylene, polybutene-1, poly-3-methylbutene-1 and polymethylpentene-1. Polyethylene may be for example medium density, high density or linear low density polyethylene.

Mixtures of the homopolymers cited above, for example mixtures of polypropylene and polyethylene, polypropylene and polybutene-1, or polypropylene and polyisobutylene and the like, may also be used.

Copolymers of monoolefins may also be used in the instant compositions, for example ethylene/propylene copolymers, propylene/butene-1 copolymers, propylene/octene-1 copolymers, ethylene/butene-1 copolymers, ethylene/octene-1 copolymers as well as ethylene/vinyl acetate copolymers.

The instant compositions particularly employ as the polyolefin component polyethylene, polypropylene, polyisobutylene, poly(butene-1), poly(pentene-1), poly(3-methylbutene-1), poly(4-methyl-pentene-1) and various ethylene or propylene copolymers.

Especially preferred polyolefin substrates are polypropylene, low density polyethylene, medium density polyethylene, high density polyethylene, linear low density polyethylene, poly(butane-1), ethylene/vinyl acetate copolymer, ethylene/propylene copolymer and copolymers of ethylene or of propylene with other alpha olefins.

The most preferred polyolefin substrate is polypropylene, high density polyethylene, ethylene/propylene copolymer or a copolymer of ethylene or of propylene with another alpha olefin.

The phenolic antioxidants useful in the instant compositions embrace a large family of compounds examples of which are given below.

ANTIOXIDANTS

Simple 2,6-dialkylphenol, such as, for example, 2,6-di-tert.-butyl-4-methylphenol, 2-tert.-butyl-4,6-dimethylphenol, 2,6-di-tert.-butyl-4-methoxymethylphenol 2,6-dioctadecyl-4-methylphenol and 2,6-di-tert-butylphenol.

Derivatives of alkylated hydroquinones, such as for example, 2,5-di-tert.-butyl-hydroquinone, 2,5-di-tert.-amylhydroquinone, 2,6-di-tert.-butyl-hydroquinone, 2,5-di-tert.-butyl-4-hydroxy-anisole, 3,5-di-tert.-butyl-4-hydroxy-anisole, tris-(3,5-di-tert.-butyl-4-hydroxyphenyl) phosphite, 3,5-di-tert.-butyl-4-hydroxyphenyl stearate and bis-(3,5-di-tert-butyl-4-hydroxyphenyl) adipate.

Hydroxylated thiodiphenyl ethers, such as, for example, 2,2'-thio-bis-(6-tert.-butyl-4-methylphenol), 2,2'-thio-bis-(4-octylphenol), 4,4'-thio-bis-(6-tert.-butyl-3-methylphenol), 4,4'-thio-bis-(3,6-di-sec.-amylphenol), 4,4'-thio-bis-(6-tert.-butyl-2-methylphenol) and 4,4'-bis-(2,6-dimethyl-4-hydroxyphenyl) disulfide.

Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6-di-tert.-butylphenol), 2,6-di(3,-tert.-butyl-5-methyl-2-hydroxybenzyl)-4-methylphenol, 2,2'-methylene-bis-[4-methyl-6-(α-methylcyclohexyl)-phenol], 1,1-bis(3,5-dimethyl-2-hydroxyphenyl)-butane, 1,1-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercaptobutane, 1,1,5,5-tetra-(5-tert.-butyl-4-hydroxy-2-methylphenyl)-pentane and ethylene glycol bis-[3,3-bis-(3-tert.-butyl-4-hydroxyphenyl)-butyrate].

O-, N- and S-benzyl compounds, such as, for example, 3,5,3',5'-tetra-tert.-butyl-4 4'-dihydroxydibenzyl ether, octadecyl 4-hydroxy-3,5-dimethylbenzyl-mercaptoacetate, tris-(3,5-di-tert.-butyl-4-hydroxybenzyl)-amine and bis-(4-tert.-butyl-3-hydroxy-2,6-dimethylbenzyl) dithioterephthalate.

Hydroxybenzylated malonates, such as for example, dioctadecyl 2,2-bis-(3,5-di-tert.-butyl-2-hydroxybenzyl)-malonate, dioctadecyl 2-(3-tert.-butyl-4-hydroxy-5-methylbenzyl)-malonate, di-dodecylmercapto-ethyl 2,2-bis-(3,5-di-tert.-butyl-4-hydroxybenzyl)-malonate and di-[4-(1,1,3,3-tetramethylbutyl)-phenyl]2,2-bis-(3,5-di-tert.-butyl-4-hydroxybenzyl)-malonate.

Hydroxybenzyl-aromatic compounds, such as, for example, 1,3,5-tri-(3,5-di-tert.-butyl-4-hydroxybenzyl)-2,4,6-trimethylbenzene, 1,4-di-(3,5-di-tert-butyl-4-hydroxybenzyl)-2,3,5,6-tetramethylbenzene and 2,4,6-tri(3,5-di-tert.-butyl-4-hydroxybenzyl)-phenol.

s-Triazine compounds, such as, for example, 2,4-bisoctylmercapto-6-(3,5-di-tert.-butyl-4-hydroxlanilino)-s-triazine, 2-octylmercapto,4,6-bis-(3,5-di-tert.-butyl-4-hydroxy anilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert-butyl-4-hydroxyphenylethyl)-s-triazine, 1,3,5-tris-(2,6-di-methyl-3-hydroxy-4-tert-butylbenzyl)isocyanurate and 1,3-5-tris-(3,5-di-tert.-butyl-4-hydroxybenzyl)isocyanurate.

Amides of β-(3,5-di-tert.-butyl-4-hydroxyphenyl)-propionic acid, such as, for example, 1,3,5-tris-(3,5-di-tert.-butyl-4-hydroxyphenyl-propionyl)-hexahydro-s-triazine and N,N'-di (3,5-di-tert.-butyl-4-hydroxyphenyl-propionyl)-hexamethylenediamine. N,N'-bis-β-(3,5-di-t-butyl-4-hydroxyphenyl)-propionylhydrazine.

Esters of β-(3,5-di-tert.-butyl-4-hydroxyphenyl)-propionic acid with monohydric or polyhydric alcohols, such as, for example with methanol, ethanol, octadecanol, 1,6-hexanediol, 1,9-nonanediol, ethylene glycol, 1,2-propanediol, diethylene glycol, thiodiethylene glycol, triethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo-[2.2.2]octane.

Esters of β-(5-tert.-butyl-4-hydroxy-3-methylphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, triethylene glycol, thiodiethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2.2.2]octane.

Esters of 3,5-di-tert.-butyl-4-hydroxyphenylacetic acid with monohydric or polyhydric alcohols, such as for example, with methanol, ethanol, octadecanol, 1,6-hexandiol, 1,9-nonanediol, ethylene glycol, 1,2-propenediol, diethylene glycol, thio-diethylene glycol, neopentylglycol, pentaerythritol, 3-thia-undecanol, 3-thia-pentadecanol, trimethylhexanediol trimethylolethane, trimethylolpropane, tris-hydroxyethyl isocyanurate and 4-hydroxymethyl-1-phospha-2,6,7-trioxabicyclo[2.2.2]-octane, especially the tetrakis ester of pentaerythritol.

Benzylphosphonates, such as, for example, dimethyl 3,5-di-tert.-butyl-4-hydroxybenzylphosphonate, diethyl 3,5-di-tert.-butyl-4-hydroxybenzylphosphonate, dioctadecyl 3,5-di-tert.-butyl-4-hydroxybenzylphosphonate and dioctadecyl 5-tert.-butyl-4-hydroxy-3-methylbenzylphosphonate.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl-4-hydroxybenzylphosphonate, 1,3,5-tris(3,5-di-tert-butyl-4-hydroxybenzyl)-isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl4-tert-butyl-3-hydroxybenzyl)isocyanurate, 1,1,3-tris(2-methyl-4-hydroxy-5-tert-butylphenyl)butane, 1,3,5-tris[2-(3,5-di-tert-butyl-4-hydroxyhydrocinnamoyloxy)ethyl]isocyanurate, 3,5-di-(3,5-di-tert-butyl-4-hydroxybenzyl)mesitol, hexamethylene bis(3,5-di-tert-butyl-4-hyroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis-[2-(3,5-di-tert-butyl-4-hydroxyhydrocinnamoyloxy)ethyl]-oxamide.

A most preferred embodiment has as the phenolic antioxidant, neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol or 2,2'-ethylidene-bis(4,6-di-tert-butylphenol).

When the instant compositions contain an organic phosphorus compound, such compounds may be for example, triphenyl phosphite, diphenylalkyl phosphites, phenyldialkyl phosphites, tri-(nonylphenyl) phosphite, trilauryl phosphite, trioctadecyl phosphite, di(isodecyloxy)-2,4,8,10-tetraoxa-3,9-diphospha-[5.5]-undecane and tri-(4-hydroxy-3,5-di-tert.butylphenyl) phosphite or similar phosphonites.

The organic phosphorus compound of particular interest is selected from the group consisting of tris(2,4-di-tert-butylphenyl) phosphite, 3,9-di(2,4-di-tert-butylphenoxy)-2,4,8,10-tetraoxa-3,9-diphospha[5.5]undecane, tris(p-nonylphenyl) phosphite, 3,9-distearyloxy-2,4,8,10-tetraoxa-3,9-diphospha[5.5]undecane, dilauryl phosphite, 3,9-di[2,6-di-tert-butyl-4-(2-(n-octadecyloxycarbonyl)ethyl)-phenoxy]-2,-4,8,10-tetraoxa-3,9-diphospha[5.5]undecane and tetrakis(2,- 4-di-tert-butylphenyl) 4,4'-bis(diphenylene)phosphonite. Tris(2,4-di-tert-butylphenyl) phosphite is especially preferred.

When the instant compositions contain a thiosynergist, such thiosynergists may be for example dilauryl thiodipropionate, distearyl thiodipropionate or neopentanetetrayl tetrakis(3-dodecylthiopropionate). Distearyl thiodipropionate or dilauryl thiodipropionate is particularly preferred.

When the instant compositions contain an alkaline metal salt of a fatty acid, such salts are the alkali metal, alkaline earth metal, zinc, cadmium or aluminum salts of the higher fatty acids for example calcium stearate, zinc stearate, magnesium behenate, sodium ricinoleate or potassium palmitate. Calcium stearate is particularly preferred.

When the instant compositions contain a hindered amine light stabilizer, such hindered amines may for example be 4-benzoyl-2,2,6,6-tetramethylpiperidine, 4-stearyloxy-2,2-6,6-tetramethylpiperidine, bis-(2,2,6,6-tetramethylpiperidyl)sebacate or 3-n-octyl-7,7,9,9-tetramethyl-1,3,-8-triaza-spiro[4.5]decane-2,4-dione.

The hindered amine light stabilizer of particular interest is selected from the group consisting of bis(2,2,-6,6- tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)-butylmalonate, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2]heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis(amino-2,2,6-6-tetramethylpiperidine) and 1,2-dibromoethane, polycondensation product of 2,4-dichloro-6-morpholino-s-triazine and 4,4'-hexamethylenebis(amino-2,2,6,6-tetramethylpiperidine), N,N'N'',N'''-tetrakis[(4,6-bis(butyl-(2,2,6,6-tetramethyl-piperidin-4-yl)-amino-s-triazin-2-yl]-1,10-diamino-4,7-diazadecane, octamethylene bis(2,2,6,6-tetramethyl-piperidin-4-carboxylate) and 4,4'-ethylenebis-(2,2,6,6-tetramethylpiperazin-3-one).

A most preferred embodiment has as the hindered amine light stabilizer bis(2,2,6,6-tetramethylpiperidin-4-yl) sebacate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2-6,6-tetramethylpiperidine) or N,N',N'',N'''-tetrakis[(4,6-bis(butyl-(2,2,6,6-tetramethyl-piperidin-4-yl)amino)-s-triazine-2-yl]-1,10-diamino-4,7-diazadecane.

When the instant compositions contain an ultraviolet light absorber, such light absorbers may include the 2H-benzotriazoles, the benzophenones, the oxanilides, the alpha-cyanocinnamates the substituted benzoate esters or the nickel salts of the O-alkyl hindered phenolic benzylphosphonates.

Examples of such ultraviolet light absorbers are seen below.

UV-ABSORBERS 2-(2'-Hydroxyphenyl)-benzotriazoles, e.g., the 5'-methyl-, 3',5'-di-tert.-butyl-, 5'-tert.-butyl-, 5'-(1,1,3,3-tetramethylbutyl)-, 5-chloro-3',5'-di-tert.-butyl-, 5-chloro-3'-tert.-butyl-5'-methyl-, 3'-sec.-butyl-5'-tert.-butyl-, 3'-α-methylbenzyl -5'-methyl, 3'-α-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl- and 5-chloro-3',5'-di-tert.-amyl-derivative.

2,4-bis-(2'-Hydroxyphenyl)-6-alkyl-s-triazines, e.g., the 6-ethyl-, 6-heptadecyl- or 6-undecyl-derivative.

2-Hydroxybenzophenones e.g., the 4-hydroxy-, 4-methoxy-, 4-octoxy-, 4-decyloxy-, 4-dodecyloxy-, 4-benzyloxy-, 4,2',4'-trihydroxy-, 2,2',4,4'-tetrahydroxy- or 2'-hydroxy-4,4'-dimethoxy-derivative.

1,3-bis-(2'-Hydroxybenzoyl)-benzenes, e.g., 1,3-bis-(2'-hydroxy-4'-hexyloxy-benzoyl)-benzene, 1,3-bis-(2'-hydroxy-4'-octyloxy-benzoyl)-benzene or 1,3-bis-(2'-hydroxy-4'-dodecyloxybenzoyl)-benzene.

Esters of optionally substituted benzoic acids, e.g., phenylsalicylate octylphenylsalicylate, dibenzoylresorcin, bis-(4-tert.-butylbenzoyl)-resorcin, benzoylresorcin, 3,5-di-tert.-butyl-4-hydroxybenzoic acid-2,4-di-tert.-butylphenyl ester or -octadecyl ester or -2-methyl-4,6-di-tert.-butyl ester.

Acrylates, e.g., α-cyano-β,β-diphenylacrylic acid-ethyl ester or isooctyl ester, α-carbomethoxy-cinnamic acid methyl ester, α-cyano-β-methyl-p-methoxy-cinnamic acid methyl ester or -butyl ester or N(β-carbomethoxyvinyl)-2-methyl-indoline.

Oxalic acid diamides, e.g., 4,4'-di-octyloxy-oxanilide, 2,2'-di-octyloxy-5,5'-di-tert.-butyl-oxanilide, 2,2'-didodecyloxy-5,5-di-tert.-butyl-oxanilide, 2-ethoxy-2'-ethyl-oxanilide, N,N'-bis-(3-dimethyl-aminopropyl)-oxalamide, 2-ethoxy-5-tert.-butyl-2'-ethyloxanilide and the mixture thereof with 2-ethoxy-2'-ethyl-5,4'-di-tert.-butyl-oxanilide, or mixtures of orlho- and paramethoxy- as well as of o- and p-ethoxy-disubstituted oxanilides.

Preferably the ultraviolet light absorber used in the instant compositions is 2-(2-hydroxy-5-methylphenyl)-2H-benzotriazole, 2-(2-hydroxy-3,5-di-tert-amylphenyl)-2H-benzotriazole, 2-[2-hydroxy-3,5-di-(alpha,alpha-dimethylbenzyl)phenyl]-2H-benzotriazole, 2-(2-hydroxy-5-tert-octylphenyl)-2H-benzotriazole, 2-hydroxy-4-octyloxybenzophenone, nickel bis(O-ethyl 3,5-di-tert-butyl-4-hydroxybenzylphosphonate), 2,4-dihydroxybenzophenone, 2-(2-hydroxy-3-tert-butyl-5-methylphenyl)-2H-benzotriazole, nickel butylamine complex with 2,2'-thiobis(4-tert-butylphenol), 2-ethoxy-2'-ethyloxanilide or 2-ethoxy-2'-ethyl-5,5'-ditert-butyloxanilide.

The stabilized polyolefin compositions of the instant invention may also contain other additives such as the pigments, colorants or dyes, light stabilizers such as metal deactivators, talc and other fillers, etc.

In general, the hydroxylamine stabilizers of this invention are employed from about 0.01 to about 5% by weight of the stabilized composition, although this will vary with the particular substrate and application. An advantageous range is from about 0.025 to about 2%, and especially 0.05 to about 1%.

The hydroxylamine compounds of this invention stabilize polyolefins especially during high temperature processing with relatively little change in color, even though the polymer may undergo a number of extrusions.

The instant stabilizers may readily be incorporated into the polyolefins by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The stabilized polyolefin compositions of the invention may optionally also contain from about 0.01 to about 5%, preferably from about 0.025 to about 2%, and especially from about 0.1% to about 0.05%, by weight of various conventional additives, such as the following, or mixtures thereof:

The following may be mentioned as examples of further additives that can be used in the instant compositions.

Metal deactivators, e.g., oxanilide , isophthalic acid dihydrazide , sebacic acid-bis-phenylhydrazide, bis-benzylideneoxalic acid dihydrazide, N,N'-diacetal-adipic acid dihydrazide, N,N'-bis-salicyloyl-oxalic acid dihydrazide, N,N'-bis-salicyloylhydrazine, N,N'-bis-(3,5-di-tert.-butyl-4-hydroxyphenylpropionyl)-hydrazine, N-salicyloyl-N'-salicylalhydrazine, 3-salicyloyl-amino-1,2,4-triazole or N,N'-bis-salicyloyl-thiopropionic acid dihydrazide.

Nucleation agents, e.g., 4-tert.-butylhenzoic acid, adipic acid, diphenylacetic acid or substituted sorbitols such as 1,3; 2,4-dibenzylidenesorbitol.

Other additives that can be incorporated in the stabilized compositions are antiblocking agents, clarifiers, antiozonants, lubricants such as stearyl alcohol, fillers, carbon black, asbestos, kaolin, talc, glass fibers, pigments, optical brighteners, flameproofing agents and antistatic agents.

While the stabilizers of this invention may be conveniently incorporated by conventional techniques into polyolefins before the fabrication thereof into shaped articles, it is also possible to apply the instant stabilizers by a topical application to the finished articles. This is particularly useful with fiber applictions where the instant stabilizers are applied topically to the fibers, for example, by way of a spin finish during the melt spinning process.

The following examples are presented for the purpose of illustration only and are not to be construed to limit the nature of scope of the instant invention in any manner whatsoever.

EXAMPLE 1

Processing Stability of Polypropylene at 500° F. (260° C.)

The base formulation comprises 100 parts of unstabilized polypropylene (Profax 6501, Hercules) with 0.10 parts of calcium stearate. The test stabilizers are solvent blended onto the polypropylene from solutions in methylene chloride. After removal of the solvent by evaporation under reduced pressure, the stabilized resin formulation is extruded at 100 rpm from a 1 inch (2.54 cm) diameter extruder under the following extruder conditions:

| Extruder Location | Temperature °F. | °C. |
|---|---|---|
| Cylinder #1 | 450 | 232 |
| Cylinder #2 | 475 | 246 |
| Cylinder #3 | 500 | 260 |
| Die #1 | 500 | 260 |
| Die #2 | 500 | 260 |

During extrusion, the internal extruder pressure is determined using a pressure transducer. After each of the first, third and fifth extrusions, resin pellets are compression molded into 125 mil (3.2 mm) thick plaques at 380° F. (193° C.) and specimen yellowness index (YI) is determined according to ASTM D1925. Low YI values indicate less yellowing.

If the transducer pressure after the fifth extrusion is nearly as high as after the first extrusion, the polypropylene is being well stabilized by the given stabilization formulation.

Results are seen in Table I.

It is clear from the data in Table I that the presence of N,N-dibenzylhydroxylamine in the polypropylene composition containing a phenolic antioxidant essentially eliminates all color formation associated with the presence of the phenolic antioxidant while the phenolic antioxidant still stabilizes the polypropylene effectively from degradation after heating.

TABLE I

Processing Stability of Polypropylene at 500° F. (260° C.)

| Stabilizer | Conc. Stabilizer % by wt. | Transducer Pressure after Extrusion psi/(Kg/cm$^2$) | | | Yellowness Index Color After Extrusion | | |
|---|---|---|---|---|---|---|---|
| | | 1 | 3 | 5 | 1 | 3 | 5 |
| Base formulation | — | 630/44.1 | 555/38.9 | 480/33.6 | 3.6 | 3.9 | 4.4 |
| Antioxidant A | 0.1 | 675/47.3 | 645/45.2 | 585/41.0 | 10.9 | 20.6 | 26.5 |
| Antioxidant A | 0.15 | 720/50.4 | 645/45.2 | 600/42.0 | 10.7 | 20.8 | 26.4 |
| Antioxidant A Compound 1 | 0.1 0.5 | 735/51.5 | 690/48.3 | 615/43.0 | 2.3 | 2.8 | 4.4 |

*Antioxidant A = neopentanetetrayl tetrakis(3,5-di-tert-butyl-4-hydroxyhydrocinnamate)
Compound 1 = N,N—dibenzylhydroxylamine.

EXAMPLE 2

Processing Stability of Polypropylene at 500° F. (260° C.)

Following the exact procedure of Example 1, polypropylene compositions containing, in addition to a phenolic antioxidant, an organic phosphorus compound are tested for processing stability in respect to repeated extrusions at 500° F. (260° C.) by measuring transducer pressures and yellowness index values. The results are seen on Table II.

TABLE II

Processing Stability of Polypropylene at 500° F. (260° C.)

| Stabilizer* | Conc. Stabilizer % by wt. | Transducer Pressure after Extrusion psi/(Kg/cm$^2$) | | | Yellowness Index Color After Extrusion | | |
|---|---|---|---|---|---|---|---|
| | | 1 | 3 | 5 | 1 | 3 | 5 |
| Base formulation | — | 630/44.1 | 555/38.9 | 480/33.6 | 3.6 | 3.9 | 4.4 |
| Antioxidant A | 0.1 | 675/47.3 | 645/45.2 | 585/41.0 | 10.9 | 20.6 | 26.5 |
| Antioxidant A | 0.15 | 720/50.4 | 645/45.2 | 600/42.0 | 10.7 | 20.8 | 26.4 |
| Antioxidant A plus Phosphorus I | 0.05 0.05 | 705/49.4 | 705/49.4 | 645/45.2 | 8.2 | 15.4 | 20.4 |
| Antioxidant A plus Phosphorus I | 0.075 0.075 | 735/51.5 | 720/50.4 | 675/47.3 | 7.3 | 12.0 | 17.0 |
| Antioxidant A (0.05%) plus Phosphorus I | 0.05 0.05 | 750/52.5 | 690/48.3 | 645/45.2 | 3.7 | 4.5 | 5.4 |

TABLE II-continued

Processing Stability of Polypropylene at 500° F. (260° C.)

| Stabilizer* | Conc. Stabilizer % by wt. | Transducer Pressure after Extrusion psi/(Kg/cm$^2$) | | | Yellowness Index Color After Extrusion | | |
|---|---|---|---|---|---|---|---|
| | | 1 | 3 | 5 | 1 | 3 | 5 |
| Compound 1 | 0.05 | | | | | | |

*Antioxidant A = neopentanetetrayl tetrakis(3,5-di-tert-butyl-4-hydroxyhydrocinnamate)
Phosphorus I = tris(2,4-di-tert-butylphenyl)phosphite
Compound 1 = N,N—dibenzylhydroxylamine.

The results in Table II show that the presence of N,N-dibenzylhydroxylamine in a polypropylene composition containing both a phenolic antioxidant and an organic phosphite processing stabilizer essentially eliminates all color formation associated with the high temperature processing of said composition while the phenolic antioxidant and organic phosphite carry out their desired functions.

EXAMPLE 3

Processing Stability of Polypropylene at 500° F. (260° C.)

Using the same procedure of Example 2, additional polypropylene compositions containing both a phenolic antioxidant and an organic phosphite are examined in respect to process stability at elevated temperatures. The results are seen on Table III.

TABLE III

Processing Stability of Polypropylene at 500° F. (260° C.)

| Stabilizer* | Conc. Stabilizer % by wt. | Transducer Pressure after Extrusion psi/(Kg/cm$^2$) | | | Yellowness Index Color After Extrusion | | |
|---|---|---|---|---|---|---|---|
| | | 1 | 3 | 5 | 1 | 3 | 5 |
| Base formulation | — | 630/44.1 | 555/38.9 | 540/37.8 | 3.3 | 3.4 | 3.6 |
| Antioxidant A | 0.1 | 765/53.6 | 765/53.6 | 715/50.0 | 9.0 | 9.4 | 10.5 |
| Antioxidant A plus Phosphorus I | 0.05 0.05 | 735/51.5 | 765/53.6 | 720/50.4 | 7.7 | 11.2 | 14.2 |
| Antioxidant A plus Phosphorus I | 0.075 0.075 | 735/51.5 | 773/54.2 | 750/52.5 | 6.8 | 8.9 | 10.5 |
| Antioxidant A (0.05) plus Phosphorus I (0.05), plus | | | | | | | |
| Compound 1 | 0.05 | 735/51.5 | 745/52.2 | 715/50.0 | 3.5 | 3.9 | 4.4 |
| Compound 2 | 0.05 | 735/51.5 | 750/52.5 | 730/51.1 | 5.7 | 7.0 | 8.5 |
| Compound 3 | 0.05 | 745/52.2 | 765/53.6 | 760/53.3 | 5.5 | 6.0 | 6.3 |

Antioxidant A = neopentanetetrayl tetrakis(3,5-di-tert-butyl-4-hydroxyhydrocinnamate)
Phosphorus I = tris(2,4-di-tert-butylphenyl)phosphite
Compound 1 = N,N—dibenzylhydroxylamine.
Compound 2 = N,N'—dicyclohexyl-N,N'—dihydroxy-p-xylylenediamine
Compound 3 = 2-n-octadecyl-4,4;6,6-di(pentamethylene)-5-hydroxy-1,3-dioxo-2,5-diazacyclohexane.

The results on Table III show that the instant hydroxylamine derivatives in each case significantly reduce discoloration associated with the high temperature extrusion of polypropylene containing a phenolic antioxidant and an organic phosphite processing stabilizer.

EXAMPLE 4

Processing Stability of Polypropylene at 500° (260° C.)

Following the procedure of Example 1, additional polypropylene compositions containing a phenolic antioxidant and an instant hydroxylamine derivative are examined in respect to process stability at elevated temperature. The results are given on Table IV.

TABLE IV

Processing Stability of Polypropylene at 500° F. (260° C.)

| Stabilizer* | Conc. Stabilizer % by wt. | Transducer Pressure after Extrusion psi/(Kg/cm$^2$) | | Yellowness Index Color After Extrusion | |
|---|---|---|---|---|---|
| | | 1 | 5 | 1 | 5 |
| Base formulation | — | 585/41.0 | 375/36.3 | 5.0 | 6.2 |
| Antioxidant A | 0.1 | 690/48.3 | 450/31.5 | 12.8 | 19.1 |
| Antioxidant A plus Compound 4 | 0.1 0.05 | 720/50.4 | 560/39.2 | 6.2 | 7.5 |

*Antioxidant A = neopentanetetrayl tetrakis(3,5-di-tert-butyl-4-hydroxyhydrocinnamate)
Compound 4 = di(1-hydroxy-2,2,6,6-tetramethylpiperidin-4-yl)sebacate.

EXAMPLE 5

Resistance to Gas Fading of Polypropylene Compositions

The base formulation comprises 100 parts of unstabilized polypropylene (Profax 6501, Hercules) with 0.10 parts of calcium stearate. Various test stabilizers are solvent blended onto the polypropylene and extruded (one extrusion) as described in Example 1 and pelletized.

The stabilized resin pellets obtained are compression molded into 125 mil (3.2 mm) thick plaques at 380° F. (193° C.) and specimen yellowness index (YI) is determined according to ASTM D1925 before exposure to gas fading at 140° F. (60° C.) and after the indicated number of days. Low YI values indicate less yellowing and less color. The gas fading procedure is carried out in an AATCC gas fume chamber (Drum Model No. 8727) according to the standard procedure of AATCC Test Method 23, Colorfastness to Burnt Gas Fumes.

The results are given in Table V.

TABLE V

Discoloration Resistance of Stabilized Polypropylene to Gas Fading

| Stabilizer* | Stabilizer Conc. (wt %) | Yellowness Index Color After Days Exposure to Gas Fading at 140° F. (60° C.) | | | | |
|---|---|---|---|---|---|---|
| | | 0 | 4 | 14 | 21 | 32 |
| Base formulation | — | 4.3 | 4.8 | 5.1 | 4.9 | 5.7 |
| Light stabilizer a | 0.25 | 5.4 | 3.3 | 4.5 | 4.7 | 5.7 |
| Light stabilizer b | 0.25 | 4.2 | 4.3 | 5.0 | 4.8 | 5.0 |
| Light stabilizer c | 0.25 | 3.8 | 3.5 | 4.8 | 4.5 | 5.0 |
| Light stabilizer d | 0.25 | 4.4 | 4.7 | 7.1 | 7.5 | 8.9 |
| Light stabilizer a | 0.25 | 3.5 | 0.1 | 0.1 | 0.1 | 2.6 |
| Compound 1 | 0.05 | | | | | |
| Antioxidant A (0.1%) plus | | | | | | |
| Light stabilizer a | 0.25 | 8.0 | 8.1 | 10.0 | 9.6 | 9.6 |
| Light stabilizer b | 0.25 | 4.4 | 4.4 | 5.0 | 5.1 | 6.2 |
| Light stabilizer c | 0.25 | 18.8 | 18.6 | 18.8 | 16.0 | 16.5 |
| Light stabilizer d | 0.25 | 9.0 | 11.7 | 13.7 | 11.3 | 12.4 |
| Antioxidant A (0.1%) plus Compound 1 (0.05%) plus | | | | | | |
| Light stabilizer a | 0.25 | 2.2 | −0.4 | −0.4 | 0.2 | 0.9 |
| Light stabilizer b | 0.25 | 2.8 | 2.5 | 3.2 | 3.5 | 4.0 |
| Light stabilizer c | 0.25 | 4.1 | 3.6 | 3.3 | 3.1 | 4.0 |
| Light stabilizer d | 0.25 | 3.4 | 2.5 | 2.7 | 2.3 | 5.2 |
| Antioxidant A | 0.1 | 2.1 | 1.0 | 2.1 | 2.2 | 2.3 |
| Compound 1 | 0.05 | | | | | |
| Antioxidant B (0.1%) plus | | | | | | |
| Light stabilizer a | 0.25 | 5.1 | 4.9 | 6.5 | 7.3 | 9.9 |
| Light stabilizer b | 0.25 | 2.5 | 1.8 | 2.2 | 2.3 | 2.9 |
| Light stabilizer c | 0.25 | 16.2 | 16.3 | 16.4 | 14.7 | 15.2 |
| Light stabilizer d | 0.25 | 5.3 | 5.5 | 7.8 | 9.9 | 14.4 |
| Antioxidant B (0.1%) plus Compound 1 (0.05%) plus | | | | | | |
| Light stabilizer a | 0.25 | 2.1 | −1.2 | −0.5 | −0.2 | 1.2 |
| Light stabilizer b | 0.25 | 2.1 | 2.0 | 2.4 | 2.5 | 4.0 |
| Light stabilizer c | 0.25 | 3.6 | 2.1 | 2.0 | 1.7 | 3.8 |
| Light stabilizer d | 0.25 | 3.1 | 1.8 | 1.9 | 2.0 | 1.8 |
| Antioxidant B | 0.1 | 1.8 | 1.0 | 0.6 | 1.7 | 1.9 |
| Compound 1 | 0.05 | | | | | |
| Antioxidant A | 0.05 | 5.1 | 2.0 | 3.8 | 4.1 | 6.4 |
| Phosphorus I | 0.05 | | | | | |
| Light stabilizer a | 0.25 | | | | | |
| Antioxidant A | 0.05 | 2.4 | −0.1 | 0.1 | 1.1 | 6.5 |
| Phosphorus I | 0.05 | | | | | |
| Light stabilizer a | 0.25 | | | | | |
| Compound 1 | 0.05 | | | | | |

*Light stabilizer a = bis(2,2,6,6-tetramethylpiperidin-4-yl)sebacate
Light stabilizer b = polycondensation product of 1(2-hydroxyethyl)-2,2,6,6-tetramethyl-4-hydroxypiperidine and succinic acid
Light stabilizer c = polycondensation product of 2,4-dichloro-6-tert-octylamino-s-triazine and 4,4′-hexamethylene bis(amino-2,2,6,6-tetramethylpiperidine)
Light stabilizer d = N,N′,N″,N‴—tetrakis[4,6-bis-(butyl-(2,2,6,6-tetramethylpiperidin-4-yl)amino)-s-triazin-2-yl]-1,10-diamino-4,7-diazadecane
Compound 1 = N,N—dibenzylhydroxylamine
Antioxidant A = neopentanetetrayl tetrakis(3,5-di-tert-butyl-4-hydroxyhydrocinnamate)
Antioxidant B = 3,5-di-tert-butyl-4-hydroxytoluene
Phosphorus I = tris(2,4-di-tert-butylphenyl)phosphite.

From the results given in Table V, it is seen that N,N-dibenzylhydroxylamine prevents the discoloration of polypropylene compositions, having various other stabilizers present, in respect to gas fading. These include polypropylene containing a hindered amine light stabilizer, or in combination with a phenolic antioxidant, or in combination with a phenolic antioxidant and an organic phosphite.

EXAMPLE 6

Resistance to Oven Aging of Polypropylene Compositions

Polypropylene compositions in pellet form are exposed to oven aging at 140° F. (60° C.) as described below.

The additives are solvent blended with polypropylene. The stabilized resin formulation is then extruded and pelletized (one extrusion) as described in Example 1.

Approximately 100 grams of pellets are enclosed in a 4 ounce (about 120 ml) Oberk jar and then exposed in an oven for the indicated number of days at 140° F. (60° C.). The color of the exposed pellets is measured by yellowness index. Results are seen in Table VI.

TABLE VI

Discoloration Resistance of Stabilized Polypropylene to Oven Aging

| Stabilizer* | Stabilizer Conc. (wt %) | Yellowness Index Color After Days Exposure to Oven aging at 140° F. (60° C.) | | | | | |
|---|---|---|---|---|---|---|---|
| | | 0 | 4 | 10 | 14 | 24 | 39 |
| Base formulation | — | 0.7 | 8.2 | 10.3 | 13.8 | 17.7 | 19.9 |
| Light stabilizer a | 0.25 | 1.8 | 11.5 | 11.0 | 12.5 | 11.4 | 10.8 |
| Light stabilizer b | 0.25 | −0.1 | 3.1 | 2.7 | 4.4 | 4.3 | 4.4 |
| Light stabilizer c | 0.25 | −0.6 | 1.4 | 0.3 | 2.2 | 2.5 | 3.5 |
| Light stabilizer d | 0.25 | 0.2 | 1.8 | 0.5 | 2.8 | 2.4 | 3.2 |
| Light stabilizer a | 0.25 | −3.0 | −1.1 | −2.3 | −1.2 | 4.2 | 5.8 |
| Compound 1 | 0.05 | | | | | | |
| Antioxidant A (0.1%) plus | | | | | | | |
| Light stabilizer a | 0.25 | 5.3 | 8.4 | 7.5 | 9.1 | 8.6 | 9.7 |
| Light stabilizer b | 0.25 | 1.1 | 3.8 | 3.1 | 5.1 | 4.9 | 5.8 |
| Light stabilizer c | 0.25 | 12.5 | 15.2 | 14.0 | 15.6 | 15.2 | 17.2 |
| Light stabilizer d | 0.25 | 7.2 | 8.4 | 7.7 | 9.4 | 8.5 | 9.3 |
| Antioxidant A (0.1%) plus Compound 1 (0.05%) plus | | | | | | | |
| Light stabilizer a | 0.25 | −1.9 | −0.5 | −1.4 | 0.3 | 1.5 | 3.0 |
| Light stabilizer b | 0.25 | −1.6 | 4.8 | 7.2 | 9.1 | 12.3 | 13.8 |
| Light stabilizer c | 0.25 | 0.5 | 1.3 | 0.0 | 2.3 | 3.5 | 6.5 |
| Light stabilizer d | 0.25 | −0.4 | 1.7 | 0.0 | 2.1 | 2.4 | 3.7 |
| Antioxidant A | 0.1 | −1.4 | 2.8 | 2.6 | 4.5 | 5.2 | 5.5 |
| Compound 1 | 0.05 | | | | | | |
| Antioxidant B (0.1%) plus | | | | | | | |
| Light stabilizer a | 0.25 | 2.2 | 5.6 | 5.4 | 7.4 | 11.1 | 27.2 |
| Light stabilizer b | 0.25 | 0.3 | 1.8 | 1.3 | 3.2 | 3.3 | 4.5 |
| Light stabilizer c | 0.25 | 7.9 | 10.2 | 10.1 | 12.3 | 17.1 | 38.2 |
| Light stabilizer d | 0.25 | 2.6 | 6.1 | 6.6 | 10.3 | 20.8 | 46.2 |
| Antioxidant B (0.1%) plus Compound 1 (0.05%) plus | | | | | | | |
| Light stabilizer a | 0.25 | −2.0 | −0.6 | −1.2 | −0.1 | 2.3 | 36.4 |
| Light stabilizer b | 0.25 | −2.7 | 3.3 | 5.6 | 7.7 | 10.1 | 14.1 |
| Light stabilizer c | 0.25 | −0.7 | −0.1 | −0.7 | 0.9 | 2.7 | 8.6 |
| Light stabilizer d | 0.25 | −0.5 | −0.1 | −0.6 | 1.4 | 1.8 | 12.0 |
| Antioxidant B | 0.1 | −1.0 | 1.9 | 2.3 | 4.7 | 5.6 | 6.3 |
| Compound 1 | 0.05 | | | | | | |
| Antioxidant A | 0.05 | 3.5 | 6.1 | 5.1 | 7.1 | 7.0 | 8.3 |
| Phosphite I | 0.05 | | | | | | |
| Light stabilizer a | 0.25 | | | | | | |
| Antioxidant A | 0.05 | −2.3 | −1.2 | −2.7 | −0.5 | −0.7 | 1.0 |
| Phosphite I | 0.05 | | | | | | |
| Light stabilizer a | 0.25 | | | | | | |

TABLE VI-continued

Discoloration Resistance of Stabilized Polypropylene to Oven Aging

| Stabilizer* | Stabilizer Conc. (wt %) | Yellowness Index Color After Days Exposure to Oven aging at 140° F. (60° C.) | | | | |
|---|---|---|---|---|---|---|
| | | 0 | 4 | 10 | 14 | 24 | 39 |
| Compound 1 | 0.05 | | | | | | |

*Light stabilizer a = bis(2,2,6,6-tetramethylpiperidin-4-yl)sebacate
Light stabilizer b = polycondensation product of 1-(2-hydroxyethyl)-2,2,6,6-tetramethyl-4-hydroxypiperidine and succinic acid
Light stabilizer c = polycondensation product of 2,4-dichloro-6-tert-octylamino-s-triazine and 4,4'-hexamethylene bis(amino-2,2,6,6-tetramethylpiperidine)
Light stabilizer d = N,N',N'',N'''—tetrakis[(4,6-bis(butyl(2,2,6,6-tetramethylpiperidin-4-yl)-amino)-s-triazin-2-yl]-1,10-diamino-4,7-diazadecane.
Compound 1 = N,N—dibenzylhydroxylamine
Antioxidant A = neopentanetetrayl tetrakis(3,5-di-tert-butyl-4-hydroxyhydrocinnamate)
Antioxidant B = 3,5-di-tert-butyl-4-hydroxytoluene
Phosphorus I = tris(2,4-di-tert-butylphenyl)phosphite.

From the results given in Table VI, it is seen that N,N-dibenzylhydroxylamine prevents the discoloration of polypropylene compositions, having various other stabilizers present, in respect to oven aging. These include polypropylene containing a hindered amine light stabilizer, or in combination with a phenolic antioxidant, or in combination with a phenolic antioxidant and an organic phosphite.

EXAMPLE 7

Resistance to Gas Fading of Polypropylene Compositions

Using the general procedure of Example 6, additional polypropylene compositions are exposed to gas fading at 140° F. (60° C.).

4 Grams of pellets of the test compositions are placed in an open 20 ml vial before setting in the fume chamber.

The results are given on Table VII.

TABLE VII

Discoloration Resistance of Stabilized Polypropylene to Gas Fading

| Stabilizer* | Stabilizer Conc. (wt %) | Yellowness Index Color After Days Exposure to Gas Fading at 140° F. (60° C.) | | | |
|---|---|---|---|---|---|
| | | 0 | 15 | 30 | 45 |
| Base formulation | — | −7.3 | −3.2 | −0.4 | −0.7 |
| Antioxidant A | 0.1 | −0.5 | 6.7 | 14.2 | 16.8 |
| Antioxidant A | 0.1 | −10.9 | −8.1 | −2.6 | 5.4 |
| Compound 1 | 0.05 | | | | |
| Antioxidant A | 0.05 | 1.0 | 7.7 | 11.0 | 13.5 |
| Phosphorus I | 0.05 | | | | |
| Antioxidant A | 0.05 | −7.0 | −6.2 | −4.7 | −3.5 |
| Phosphorus I | 0.05 | | | | |
| Compound 1 | 0.05 | | | | |

*Antioxidant A = neopentanetetrayl tetrakis(3,5-di-tert-butyl-4-hydroxyhydrocinnamate)
Compound 1 = N,N—dibenzylhydroxylamine
Phosphorus I = tris(2,4-di-tert-butylphenyl)phosphite From the results seen in Table VII, N,N-dibenzylhydroxylamine is very effective in preventing the gas fading discoloration of polypropylene compositions containing a phenolic antioxidant or a combination of a phenolic antioxidant and an organic phosphite.

EXAMPLE 8

Processing Stability of Polypropylene at 500° F. (260° C.)

Following the procedure of Example 1, polypropylene is stabilized with a variety of phenolic antioxidants with or without the presence of N,N-dibenzylhydroxylamine and the yellowness index (YI) after one, three and five extrusions is measured as seen on Table VIII.

In every case the polypropylene compositions containing the phenolic antioxidant plus N,N-dibenzylhydroxylamine exhibits far less color than the polypropylene with phenolic antioxidant alone.

TABLE VIII

Processing Stability of Polypropylene at 500° F. (260° C.)

| Stabilizer* | Conc. Stabilizer % by wt. | Yellowness Index Color After Extrusion | | |
|---|---|---|---|---|
| | | 1 | 3 | 5 |
| Base formulation | — | 5.2 | 5.7 | 6.5 |
| Antioxidant A | 0.1 | 10.5 | 16.9 | 20.1 |
| Antioxidant A plus | 0.1 | 4.3 | 5.2 | 10.8 |
| Compound 1 | 0.05 | | | |
| Antioxidant B | 0.1 | 9.0 | 14.2 | 17.5 |
| Antioxidant B plus | 0.1 | 4.8 | 4.9 | 5.9 |
| Compound 1 | 0.05 | | | |
| Antioxidant C | 0.1 | 10.4 | 14.8 | 16.0 |
| Antioxidant C plus | 0.1 | 4.4 | 5.5 | 9.1 |
| Compound 1 | 0.05 | | | |
| Antioxidant D | 0.1 | 8.7 | 14.0 | 16.8 |
| Antioxidant D plus | 0.1 | 4.1 | 5.0 | 6.7 |
| Compound 1 | 0.05 | | | |
| Antioxidant E | 0.1 | 10.6 | 18.1 | 20.5 |
| Antioxidant E plus | 0.1 | 4.5 | 5.2 | 6.8 |
| Compound 1 | 0.05 | | | |
| Antioxidant F | 0.1 | 8.6 | 14.0 | 18.4 |
| Antioxidant F plus | 0.1 | 4.5 | 5.5 | 8.3 |
| Compound 1 | 0.05 | | | |
| Antioxidant G | 0.1 | 11.2 | 20.7 | 25.0 |
| Antioxidant G plus | 0.1 | 5.7 | 8.4 | 14.2 |
| Compound 1 | 0.05 | | | |
| Antioxidant H | 0.1 | 11.9 | 22.1 | 17.0 |
| Antioxidant H plus | 0.1 | 5.8 | 7.1 | 17.3 |
| Compound 1 | 0.5 | | | |
| Antioxidant I | 0.1 | 11.7 | 16.1 | 18.8 |
| Antioxidant I plus | 0.1 | 8.3 | 9.0 | 11.6 |
| Compound 1 | 0.05 | | | |
| Antioxidant J | 0.1 | 11.0 | 16.0 | 18.0 |
| Antioxidant J plus | 0.1 | 3.8 | 4.6 | 5.5 |
| Compound 1 | 0.05 | | | |
| Antioxidant K | 0.1 | 10.4 | 14.3 | 17.0 |
| Antioxidant K plus | 0.1 | 3.7 | 4.2 | 5.6 |
| Compound 1 | 0.05 | | | |
| Antioxidant L | 0.1 | 11.7 | 22.3 | 26.4 |
| Antioxidant L plus | 0.1 | 4.4 | 5.4 | 9.1 |
| Compound 1 | 0.05 | | | |

*Antioxidant A = neopentanetetrayl tetrakis(3,5-di-tert-butyl-4-hydroxyhydrocinnamate).
Antioxidant B = 3,5-di-tert-butyl-4-hydroxytoluene.
Antioxidant C = n-octadecyl 3,5-di-tert-butyl-4-hydroxyhydrocinnamate.
Antioxidant D = 1,3,5-trimethyl-2,4,6-tris(3,5-di-tert-butyl-4-hydroxybenzyl)benzene.
Antioxidant E = thiodiethylene bis(3,5-di-tert-butyl-4-hydroxyhydrocinnamate).
Antioxidant F = 3,6-dioxaoctamethylene bis(3-methyl-5-tert-butyl-4-hydroxyhydrocinnamate)
Antioxidant G = bis(3,5-di-tert-butyl-4-hydroxyhydrocinnamoyl)hydrazide.
Antioxidant H = 1,1,3-tris(2-methyl-4-hydroxy-5-tert-butylphenyl)butane.
Antioxidant I = 2,2'-ethylidene-bis(4,5-di-tert-butyl-phenol).
Antioxidant J = 1,3,5-tris(3,5-di-tert-butyl-4-hydroxybenzyl)isocyanurate.
Antioxidant K = 1,3,5-tris[2-(3,5-di-tert-butyl-4-hydroxycinnamoyloxy)ethyl]isocyanurate.
Antioxidant L = 3,5-di-(3,5-di-tert-butyl-4-hydroxy-benzyl)mesitol.
Compound 1 = N,N—dibenzylhydroxylamine.

EXAMPLE 9

Processing Stability of Polypropylene at 500° F. (260° C.)

Following the procedure of Example 2, polypropylene compositions containing, in addition to a phenolic antioxidant, an organic phosphorus compound are tested in respect to process stability by measuring yellowness index values. The results are seen on Table IX.

In each case the composition containing a phenolic antioxidant, organic phosphorus compound and N,N- dibenzylhydroxylamine exhibits much less yellow color after extrusion than does the corresponding composition without the N,N-dibenzylhydroxylamine present.

TABLE IX

Processing Stability of Polypropylene at 500° F. (260° C.)

| Stabilizer* | Conc. Stabilizer % by wt. | Yellowness Index Color After Extrusion | | |
|---|---|---|---|---|
| | | 1 | 3 | 5 |
| Base formulation | — | 5.2 | 5.7 | 6.5 |
| Antioxidant A plus Phosphorus II | 0.1 0.05 | 7.1 | 9.1 | 10.2 |
| Antioxidant A plus Phosphorus II plus Compound 1 | 0.1 0.05 0.05 | 4.0 | 4.0 | 6.4 |
| Antioxidant A plus Phosphorus II | 0.1 0.05 | 9.2 | 13.0 | 14.3 |
| Antioxidant A plus Phosphorus III plus Compound 1 | 0.1 0.05 0.05 | 4.6 | 4.7 | 6.5 |
| Antioxidant A plus Phosphorus IV | 0.1 0.05 | 5.0 | 7.0 | 9.9 |
| Antioxidant A plus Phosphorus IV plus Compound 1 | 0.1 0.05 0.05 | 4.3 | 4.6 | 4.6 |
| Antioxidant A plus Phosphorus V | 0.1 0.05 | 5.7 | 7.7 | 9.7 |
| Antioxidant A plus Phosphorus V plus Compound 1 | 0.1 0.05 0.05 | 4.5 | 4.8 | 6.0 |
| Antioxidant A plus Phosphorus VI | 0.1 0.05 | 9.9 | 12.2 | 13.6 |
| Antioxidant A plus Phosphorus VI plus Compound 1 | 0.1 0.05 0.05 | 4.5 | 5.6 | 7.5 |
| Antioxidant C plus Phosphorus I | 0.1 0.05 | 8.2 | 9.1 | 12.8 |
| Antioxidant C plus Phosphorus I plus Compound 1 | 0.1 0.05 0.05 | 3.8 | 5.2 | 5.5 |
| Antioxidant C plus Phosphorus IV | 0.1 0.05 | 6.6 | 11.0 | 12.2 |
| Antioxidant C plus Phosphorus IV plus Compound 1 | 0.1 0.05 0.05 | 4.5 | 4.9 | 4.9 |

*Antioxidant A = neopentanetetrayl tetrakis(3,5-di-tert-butyl-4-hydroxyhydrocinnamate).
Antioxidant C = n octadecyl 3,5-di-tert-butyl-4-hydroxyhydrocinnamate.
Phosphorus I = tris(2,4-di-tert-butylphenyl)phosphite
Phosphorus II = 3,9-distearyloxy-2,4,8,10-tetraoxa-3,9-diphospha[5.5]undecane
Phosphorus III = tris(p-nonylphenyl)phosphite
Phosphorus IV = 3,9-di[2,6-di-tert-butyl-4-(2-n-octa-decyloxycarbonyl)ethyl]-phenoxy]-2,4,8,10-tetraoxa-3,9-diphospha[5.5]undecane.
Phosphorus V = tetrakis(2,4-di-tert-butylphenyl)4,4'-bis(diphenylene)phosphonite
Phosphorus VI = dilauryl phosphite
Compound 1 = N,N—dibenzylhydroxylamine.

EXAMPLE 10

Processing Stability of Polypropylene at 500° F. (260° C.)

Following the procedure of Example 1, polypropylene compositions containing a phenolic antioxidant with or without N,N-dibenzylhydroxylamine are tested for resistance to yellowing (discoloration) following extrusion at high temperature. A number of different polypropylene resins are compared as seen on Table X.

In each case the presence of N,N-dibenzylhydroxylamine leads to much lower yellowness index values (much less discoloration) in each polypropylene resin tested.

TABLE X

Processing Stability of Polypropylene at 500° F. (260° C.)

| Stabilizer* | Conc. Stabilizer % by wt. | Yellowness Index Color After Extrusion | | |
|---|---|---|---|---|
| | | 1 | 3 | 5 |
| Base formulation V | — | 5.2 | 5.7 | 6.5 |
| Antioxidant A | 0.1 | 10.5 | 16.9 | 20.1 |
| Antioxidant A plus Compound 1 | 0.1 0.05 | 4.3 | 5.2 | 10.8 |
| Base formulation W | — | 4.8 | 8.1 | 7.8 |
| Antioxidant A | 0.1 | 16.8 | 23.3 | 26.4 |
| Antioxidant A plus Compound 1 | 0.1 0.05 | 5.8 | 7.2 | 9.9 |
| Base formulation X | — | 3.8 | 4.2 | 4.7 |
| Antioxidant A | 0.1 | 9.7 | 15.0 | 17.2 |
| Antioxidant A plus Compound 1 | 0.1 0.05 | 3.8 | 3.7 | 7.4 |
| Base formulation Y | — | 4.9 | 5.8 | 6.6 |
| Antioxidant A | 0.1 | 15.1 | 18.4 | 21.5 |
| Antioxidant A plus Compound 1 | 0.1 0.05 | 4.6 | 5.6 | 11.1 |
| Base formulation Z | — | 1.8 | 2.7 | 2.4 |
| Antioxidant A | 0.1 | 10.7 | 15.5 | 20.4 |
| Antioxidant A plus Compound 1 | 0.1 0.05 | 1.8 | 3.0 | 6.8 |

*Antioxidant A = neopentanetetrayl tetrakis(3,5-di-tert-butyl-4-hydroxyhydrocinnamate)
Compound 1 = N,N—dibenzylhydroxylamine.
Each base formulation contains polypropylene resin plus 0.1% by weight calcium stearate.
Base Formulation V = Profax 6501, Hercules.
Base Formulation W = Fortilene, Soltex
Base Formulation X = RMO, Gulf
Base Formulation Y = 8600, Arco
Base Formulation Z = Marlex GP, Phillips

EXAMPLE 11

Processing Stability of Polypropylene at 500° F. (260° C.)

The procedure of Example 1 is followed except that a number of hydroxylamine related compounds are substituted for N,N-dibenzylhydroxylamine as seen on Table XI.

The results show that a number of such hydroxylamines exhibit beneficial effects particularly N,N-di-n-octylhydroxylamine.

TABLE XI

Processing Stability of Polypropylene at 500° F. (260° C.)

| Stabilizer* | Conc. Stabilizer % by wt. | Transducer Pressure after Extrusion psi/(Kg/cm$^2$) | | | Yellowness Index Color After Extrusion | | |
|---|---|---|---|---|---|---|---|
| | | 1 | 3 | 5 | 1 | 3 | 5 |
| Base formulation | — | 615/43.0 | 570/39.9 | 510/35.7 | 4.3 | 6.1 | 7.4 |
| Antioxidant A | 0.1 | 690/48.3 | 675/47.3 | 630/44.1 | 7.2 | 11.7 | 15.3 |
| Antioxidant A (0.1%) plus | | | | | | | |
| Compound 1 | 0.05 | 705/49.4 | 690/48.3 | 645/45.2 | 1.7 | 2.7 | 4.1 |
| Compound 2 | 0.05 | 720/50.4 | 690/48.3 | 645/45.2 | 5.7 | 8.0 | 10.0 |
| Compound 4 | 0.05 | 735/51.5 | 720/50.4 | 675/47.3 | 5.0 | 7.9 | 11.1 |
| Compound 5 | 0.05 | 690/48.3 | 675/47.2 | 615/43.0 | 2.9 | 5.3 | 10.8 |
| Compound 6 | 0.05 | 705/49.4 | 675/47.3 | 630/44.1 | 1.5 | 3.0 | 3.7 |
| Compound 7 | 0.05 | 750/52.5 | 735/51.5 | 70/49.0 | 7.1 | 9.5 | 11.7 |
| Compound 8 | 0.05 | 750/52.5 | 730/51.1 | 690/48.3 | 6.7 | 9.0 | 11.2 |

TABLE XI-continued

Processing Stability of Polypropylene at 500° F. (260° C.)

| Stabilizer* | Conc. Stabilizer % by wt. | Transducer Pressure after Extrusion psi/(Kg/cm$^2$) | | | Yellowness Index Color After Extrusion | | |
|---|---|---|---|---|---|---|---|
| | | 1 | 3 | 5 | 1 | 3 | 5 |
| Compound 9 | 0.05 | 720/50.4 | 735/51.5 | 705/49.4 | 7.0 | 9.2 | 11.2 |

*Antioxidant A = neopentanetetrayl tetrakis(3,5-di-tert-butyl-4-hydroxyhydrocinnamate).
Compound 1 = N,N—dibenzylhydroxylamine.
Compound 2 = N,N'—dicyclohexyl-N,N'—dihydroxy-p-xylylenediamine.
Compound 4 = di(1-hydroxy-2,2,6,6-tetramethylpiperidin-4-yl)sebacate.
Compound 5 = N—cyclohexylhydroxylamine.
Compound 6 = N,N—di-n-octylhydroxylamine.
Compound 7 = 1-hydroxy-2,2,6,6-tetramethyl-4-benzoxypiperidine.
Compound 8 = 1-hydroxy-2,2,6,6-tetramethyl-4-(3,5-di-tert-butyl-4-hydroxyhydrocinnamoyloxy)piperidine.
Compound 9 = N—(1-hydroxy-2,2,6,6-tetramethylpiperidin-4-yl)-epsilon-caprolactam.

EXAMPLE 12

Process Stabilization of Polyethylene at 525° F. (274° C.)

Using the general procedure of Example 1, a base formulation comprising high density polyethylene (HHM-4903, Phillips) is compounded with the indicated stabilizers and the yellowness index (YI) color after extrusion as well as the melt flow rate (in grams/10 minutes using ASTM D-1238, Condition N are measured as seen on Table XII.

TABLE XII

Processing Stability of High Density Polyethylene at 525° F. (274° C.)

| Stabilizer* | Conc. Stabilizer % by wt. | Melt Flow Rate after Extrusion (g/10 min.) | | Yellowness Index Color After Extrusion | | |
|---|---|---|---|---|---|---|
| | | 1 | 5 | 1 | 3 | 5 |
| Base formulation | — | 2.9 | 1.7 | −10.7 | −10.9 | −10.9 |
| Antioxidant A | 0.02 | 3.3 | 2.7 | −4.7 | −2.8 | −1.7 |
| Antioxidant A | 0.04 | 3.6 | 2.9 | −3.7 | −0.1 | 1.2 |
| Antioxidant A | 0.08 | 3.8 | 3.6 | −1.6 | 3.8 | 5.4 |
| Antioxidant A (0.04%) plus | | | | | | |
| Compound 1 | 0.02 | 4.5 | 4.1 | −3.8 | 3.9 | 7.1 |
| Compound 1 | 0.04 | 4.8 | 4.7 | 5.0 | 3.4 | 7.6 |
| Compound 1 | 0.08 | 4.9 | 5.2 | −7.3 | −1.5 | 4.1 |
| Antioxidant A Phosphorus I | 0.02 0.02 | 4.2 | 3.5 | −1.5 | 4.2 | 6.5 |
| Antioxidant A Phosphorus I Compound 1 | 0.02 0.02 0.04 | 5.1 | 4.7 | −5.9 | 0.4 | 4.1 |
| Antioxidant I Phosphorus I | 0.02 0.02 | 4.1 | 3.2 | −3.6 | −1.3 | −0.9 |
| Antioxidant I Phosphorus I Compound I | 0.02 0.02 0.04 | 4.8 | 4.5 | −5.2 | 2.0 | 5.5 |

*Antioxidant A = neopentanetetrayl tetrakis(3,5-di-tert-butyl-4-hydroxyhydrocinnamate)
Antioxidant I = 2,2'-ethylidene-bis(4,6-di-tert-butylphenol)
Phosphorus I = tris(2,4-di-tert-butylphenyl)phosphite
Compound 1 = N,N—dibenzylhydroxylamine.

EXAMPLE 13

Process Stabilization of Polyethylene at 525° F. (274° C.)

Following the general procedure of Example 12, various polyethylene compositions containing a phenolic antioxidant with or without N,N-dibenzylhydroxylamine are measured for process stability by melt flow rate and for discoloration by yellowness index as seen on Table XIII.

TABLE XIII

Processing Stability of High Density Polyethylene at 525° F. (274° C.)

| Stabilizer* | Conc. Stabilizer % by wt. | Melt Flow Rate after Extrusion (g/10 min.) | | Yellowness Index Color After Extrusion | | |
|---|---|---|---|---|---|---|
| | | 1 | 5 | 1 | 3 | 5 |
| Base Resin R | — | 2.9 | 2.1 | −9.6 | −8.7 | −7.7 |
| Antioxidant C | 0.02 | 3.1 | 3.0 | −7.8 | −5.9 | −4.4 |
| Antioxidant C | 0.04 | 3.1 | 3.2 | −6.5 | −4.3 | −2.6 |
| Antioxidant C | 0.01 | 4.0 | 3.1 | −8.1 | −4.5 | −3.5 |
| Compound 1 | 0.01 | | | | | |
| Antioxidant C Compound 1 | 0.02 0.02 | 3.1 | 2.5 | −9.9 | −9.7 | −9.3 |
| Base Resin S | — | 3.1 | 2.0 | −8.7 | −8.8 | −7.2 |
| Antioxidant A | 0.02 | 4.0 | 3.0 | −5.0 | −3.4 | −1.8 |
| Antioxidant A Compound 1 | 0.02 0.02 | 4.6 | 3.6 | −7.3 | −4.2 | −1.0 |
| Base Resin T | — | 52.0 | 47.8 | −7.9 | −8.1 | −7.4 |
| Antioxidant A | 0.02 | 57.0 | 49.0 | −7.2 | −6.7 | −5.8 |
| Antioxidant A Compound 1 | 0.02 0.02 | 58.0 | 57.0 | −7.4 | −5.8 | −4.2 |
| Basic Resin U | — | 32.0 | 23.5 | −6.1 | −5.2 | −2.9 |
| Antioxidant A | 0.02 | 34.0 | 27.0 | 4.3 | 13.4 | 18.7 |
| Antioxidant A | 0.02 | 34.0 | 35.6 | −5.7 | 1.8 | 11.1 |

TABLE XIII-continued

Processing Stability of High
Density Polyethylene at 525° F. (274° C.)

| Conc. Stabilizer | Melt Flow Rate after Extrusion (g/10 min.) | Yellowness Index Color After Extrusion |
|---|---|---|
| Compound 1 | 0.02 | |

*Antioxidant A = neopentanetetrayl tetrakis(3,5-di-tert-butyl-4-hydroxyhydrocinnamate).
Antioxidant C = n-octadecyl 3,5-di-tert-butyl-4-hydroxyhydrocinnamate.
Compound 1 = N,N—dibenzylhydroxylamine.
Base Resin R = HHM-4903, Phillips high density polyethylene
Base Resin S = Chemplex 5602, Chemplex high density polyethylene.
Base Resin T = DNDU 1062, Union Carbide low density polyethylene.
Base Resin U = Exxon linear low density, Exxon polyethylene (Unipol process).

EXAMPLE 14

Following the general procedure of Example 6, polypropylene (Profax 6501, Hercules) containing 0.1% by weight of calcium stearate is formulated with a phenolic antioxidant with or without N,N-dibenzylhydroxylamine. One portion of the polypropylene is extruded once and then compression molded into 125 mil (3.2 mm) thick plaques as described in Example 5. Another portion of the polypropylene is extruded five times before being molded into similar size plaques.

The yellowness index (YI) color of the molded plaques is measured and they are then exposed to thermal aging in an oven at 150° C. The yellowness index color is measured at intervals and the hours to failure noted. Failure is deemed to be when cracking or browning of the edges of the plaques is visually observed. These data are given on Table XIV.

The polypropylene plaques containing both the phenolic antioxidant and N,N-dibenzylhydroxylamine have much less yellow discoloration than the corresponding plaques containing no N,N-dibenzylhydroxylamine.

TABLE XIV

Oven Aging of Polypropylene Plaques at 150° C.

| Stabilizer* | Stabilizer Conc. (wt %) | Yellowness Index Color After Hours at 150° C. | | | | | Hours to Failure (Visual) |
|---|---|---|---|---|---|---|---|
| | | 0 | 100 | 325 | 485 | 1000 | |
| (after being extruded once) | | | | | | | |
| Base formulation | — | 3.6 | | | | | 20 |
| Antioxidant A | 0.1 | 10.9 | 22 | 35 | 42 | — | 865 |
| Antioxidant A | 0.15 | 10.7 | 25 | 42 | 50 | 57 | 1305 |
| Antioxidant A Compound 1 | 0.1 0.05 | 2.3 | 10.7 | 28 | 36 | 45 | 1105 |
| (after being extruded five times) | | | | | | | |
| Base formulation | — | 4.4 | | | | | 20 |
| Antioxidant A | 0.1 | 26.5 | 36 | 50 | 54 | 57 | 790 |
| Antioxidant A Compound 1 | 0.1 0.05 | 4.4 | 14 | 30 | 39 | 47 | 1040 |

*Antioxidant A = neopentanetetrayl tetrakis(3,5-di-tert-butyl-4-hydroxyhydrocinnamate).
Compound 1 = N,N—dibenzylhydroxylamine.

EXAMPLE 15

Processing Stability of Polypropylene at 500° F. (260° C.)

Following the procedure of Example 11, N,N-di-tert-butylhydroxylamine is substituted for N,N-dibenzylhydroxylamine for stabilizing a polypropylene composition containing a phenolic antioxidant.

The results of these tests are shown in Table XV where it is seen that N,N-di-tert-butylhydroxylamine very effectively prevents discoloration of said polypropylene composition.

TABLE XV

Processing Stability of Polypropylene at 500° F. (260° C.)

| Stabilizer* | Conc. Stabilizer % by wt. | Transducer Pressure after Extrusion psi/(Kg/cm²) | | | Yellowness Index Color After Extrusion | | |
|---|---|---|---|---|---|---|---|
| | | 1 | 3 | 5 | 1 | 3 | 5 |
| Base formulation | — | 540/37.8 | 510/35.7 | — | 3.6 | 4.3 | 4.8 |
| Antioxidant A | 0.1 | 750/52.5 | 705/49.4 | 675/47.3 | 7.3 | 11.2 | 13.1 |
| Antioxidant A (0.1%) plus Compound 10 | 0.05 | 720/50.4 | 690/48.3 | 745/52.2 | 1.9 | 4.9 | 7.1 |

*Antioxidant A = neopentanetetrayl tetrakis(3,5-di-tert-butyl-4-hydroxyhydrocinnamate).
Compound 10 = N,N—di-tert-butylhydroxylamine.

EXAMPLE 16

Processing Stability of Polypropylene at 500° F. (260° C.)

Following the exact procedure of Example 1, polypropylene compositions containing, in addition to a phenolic antioxidant, a thiosynergist are tested for processing stability in respect to repeated extrusions at 500° F. (260° C.) by measuring transducer pressures and yellowness index values. The results are seen on Table XVI.

TABLE XVI

Processing Stability of Polypropylene at 500° F. (260° C.)

| Stabilizer* | Conc. Stabilizer % by wt. | Transducer Pressure after Extrusion psi/(Kg/cm$^2$) | | | Yellowness Index Color After Extrusion | | |
|---|---|---|---|---|---|---|---|
| | | 1 | 3 | 5 | 1 | 3 | 5 |
| Base formulation | — | 540/37.8 | 510/35.2 | — | 3.6 | 4.3 | 4.8 |
| Antioxidant A | 0.1 | 750/52.5 | 705/49.4 | 675/47.3 | 7.3 | 11.2 | 13.1 |
| Antioxidant A | 0.01 | 750/52.5 | 705/49.4 | 685/47.9 | 4.1 | 9.7 | 11.9 |
| Thiosynergist p | 0.05 | | | | | | |
| Antioxidant A | 0.1 | 750/52.5 | 720/50.4 | 705/49.4 | 2.2 | 3.2 | 4.2 |
| Thiosynergist p | 0.05 | | | | | | |
| Compound 1 | 0.05 | | | | | | |

*Antioxidant A = neopentanetetrayl tetrakis(3,5-di-tert-butyl-4-hydroxyhydrocinnamate).
Thiosynergist p = distearyl thiodipropionate.
Compound 1 = N,N—dibenzylhydroxylamine.

The results in Table XVI show that the presence of N,N-dibenzylhydroxylamine in a polypropylene composition containing both a phenolic antioxidant and a thiosynergist essentially eliminates all color formation associated with the high temperature processing of said composition while the phenolic antioxidant and thiosynergist carry out their desired functions.

EXAMPLES 17–20

When, following the procedure of Examples 5 or 6, a polypropylene composition containing a phenolic antioxidant and Ex 17. an ultraviolet light absorber;

Ex 18. an ultraviolet light absorber, and an organic phosphite;

Ex 19. an ultraviolet light absorber, and a hindered amine light stabilizer; or

Ex 20. a hindered amine light stabilizer, an organic phosphite and a thiosynergist is tested for resistance to discoloration on gas fading or on oven ageing, the presence of an instant hydroxylamine compound prevents discoloration from occurring.

EXAMPLE 21

Effect of Calcium Stearate on the Color of Polypropylene Processed at 500° F. (260° C.)

Using the procedure of Example 1, polypropylene (Profax 6501, Hercules) is extruded and the yellowness index (YI) determined after the first, third and fifth extrusions to see the effect of the various stabilizers on color. Compositions containing no calcium stearate are compared to compositions, otherwise the same, which contain calcium stearate. The test plaques are molded at 450° F. (232° C.).

Results are seen in Table XVII.

TABLE XVII

| Stabilizer* | Conc. Stabilizer % by wt. | Yellowness Index Color After Extrusion | | |
|---|---|---|---|---|
| | | 1 | 3 | 5 |
| None | — | 1.6 | 2.5 | 2.9 |
| Compound 1 | 0.05 | 1.3 | 4.6 | 5.3 |
| Antioxidant A | 0.1 | 5.7 | 6.6 | 8.1 |
| Antioxidant A plus Cpd 1 | 0.1 0.05 | 2.2 | 8.0 | 12.8 |
| Calcium Stearate | 0.1 | 0.1 | 1.6 | 2.4 |
| Calcium Stearate (0.1) plus | | | | |
| Compound 1 | 0.05 | 1.0 | 1.8 | 3.3 |
| Antioxidant A | 0.1 | 4.8 | 6.4 | 9.2 |
| Antioxidant A | 0.1 | 1.0 | 1.5 | 4.0 |

TABLE XVII-continued

Color of Polypropylene Processed at 500° F. (260° C.)

| Stabilizer* | Conc. Stabilizer % by wt. | Yellowness Index Color After Extrusion | | |
|---|---|---|---|---|
| | | 1 | 3 | 5 |
| plus Cpd 1 | 0.05 | | | |

*Compound 1 is N,N—dibenzylhydroxylamine.
Antioxidant A is neopentanetetrayl tetrakis (3,5-di-tert-butyl-4-hydroxyhydrocinnamate)

In the absence of calcium stearate, after one extrusion the hydroxylamine alone or in combination with the phenolic antioxidant improves color over the comparable control composition without the hydroxylamine. However, after further extrusions in each case the yellowness index for the composition containing the hydroxylamine is higher than that of the comparable control composition without the hydroxylamine.

However, in the presence of calcium stearate quite the opposite is true and the compositions containing both hydroxylamine and calcium stearate are far superior in color even after five extrusions, particularly in the presence of the phenolic antioxidant.

EXAMPLE 22

Effect of Calcium Stearate on the Color of High Density Polyethylene Processed at 525° F. (274° C.)

Using the procedure of Example 12, high density polyethylene (HHM-4903, Phillips) is extruded and the yellowness index determined to see the effect of the various stabilizers on color. Compositions containing no calcium stearate are compared to compositions, otherwise the same, which contain calcium stearate. The test plaques are molded at 380° F. (193° C.).

Results are seen in Table XVIII.

TABLE XVIII

Color of High Density Polyethylene Processed at 525° F. (274° C.)

| Stabilizer* | Conc. Stabilizer % by wt. | Yellowness Index Color After Extrusion | | |
|---|---|---|---|---|
| | | 1 | 3 | 5 |
| None | — | −2.2 | −2.9 | −2.8 |
| Compound 1 | 0.05 | −2.6 | −0.7 | 0.0 |
| Antioxidant A | 0.1 | 0.1 | 1.7 | 2.4 |
| Antioxidant A plus Cpd 1 | 0.1 0.05 | −1.0 | 3.1 | 5.6 |
| Calcium Stearate | 0.1 | −3.5 | −3.7 | −3.4 |
| Calcium Stearate (0.1) plus | | | | |
| Compound 1 | 0.05 | −3.4 | −2.3 | −1.3 |
| Antioxidant A | 0.1 | 0.5 | 3.1 | 4.4 |

TABLE XVIII-continued

| | Color of High Density Polyethylene Processed at 525° F. (274° C.) | | | |
|---|---|---|---|---|
| | Conc. Stabilizer | Yellowness Index Color After Extrusion | | |
| Stabilizer* | % by wt. | 1 | 3 | 5 |
| Antioxidant A plus Cpd 1 | 0.1 0.05 | −2.6 | −0.6 | 0.8 |

*Compound 1 is N,N—dibenzylhydroxylamine.
Antioxidant A is neopentanetetrayl tetrakis (3,5-di-tert-butyl-4-hydroxyhydrocinnamate)

In the absence of calcium stearate, after one extrusion the hydroxylamine alone or in combination with the phenolic antioxidant improves color over the comparable control composition without the hydroxylamine. However, after further extrusions in each case the yellowness index for the composition containing the hydroxylamine is higher than that of the comparable control composition without the hydroxylamine.

However, in the presence of calcium stearate quite the opposite is true and the compositions containing both hydroxylamine and calcium stearate are far superior in color even after five extrusions, particularly in the presence of the phenolic antioxidant.

EXAMPLE 23

Effect of Calcium Stearate on Process Stabilization of High Density Polyethylene at 525° F. (274° C.)

Using the procedure of Examples 12 and 22, melt flow rate data are obtained on high density polyethylene (HHM-4903, Phillips) after one, three and five extrusions. Compositions containing no calcium stearate are compared to compositions, otherwise the same, which do contain calcium stearate.

Results are seen in Table XIX.

TABLE XIX

| | Process Stabilization of High Density Polyethylene Processed at 525° F. (274° C.) | | | |
|---|---|---|---|---|
| | Conc. Stabilizer | Melt Flow Rate After Extrusion (g/10 min) | | |
| Stabilizer* | % by wt. | 1 | 3 | 5 |
| None | — | 4.5 | 3.5 | 2.5 |
| Antioxidant A | 0.1 | 4.75 | 4.6 | 4.45 |
| Antioxidant A plus Cpd 1 | 0.1 0.05 | 5.8 | 5.75 | 5.75 |
| Calcium Stearate | 0.1 | 3.6 | 2.7 | 1.75 |
| Calcium Stearate (0.1) plus | | | | |
| Antioxidant A | 0.1 | 4.95 | 4.6 | 4.2 |
| Antioxidant A plus Cpd 1 | 0.1 0.05 | 5.8 | 5.75 | 5.75 |

*Compound 1 is N,N—dibenzylhydroxylamine.
Antioxidant A is neopentanetetrayl tetrakis (3,5-di-tert-butyl-4-hydroxyhydrocinnamate)

Calcium stearate has essentially no effect on the process stabilization of high density polyethylene even though it greatly improves the color of such compositions as seen in Example 22.

What is claimed is:

1. A composition, stabilized against discoloration, which comprises
   (a) a saturated polyolefin or mixture thereof,
   (b) a stabilizing amount of an alkaline metal salt of a fatty acid, or mixture thereof,
   (c) a stabilizing amount of a phenolic antioxidant, or mixture thereof, selected from the group consisting of
   n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyy-2,4-6-tris(3,5-di-tert-butyl-4-hydroxybenzyl)benzene, 3,6-di-oxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocyanurate, 1,1,3-tris (2-methyl-4-hydroxy-5-tert-butylphenyl)butane, 1,3,5-tris[2-(3,5-di-tert-butyl-4-hydroxyhydrocinnamoyloxy)-ethyl]-isocyanurate, 3,5-di-(3,5-di-tert-butyl-4-hydroxybenzyl)-mesitol, hexamethylene bis(3,5-di-tert-butyl-4-hydroxyhydrocinnamate), 1-(3,5-di-tert-butyl-4-hydroxyanilion)-3,-5-di(octylthio)-s-triaxine, N,N'-hexamethylene-bis(3,5-di-tert-buty-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)-butyrate], octyl 3,5-di-tert-butyl-4-hydroxybenzyl-mercaptoacetate, bis(3,5-di-tert-butyl-4-hydroxyhydrocinnamoyl)hydrazide, and N,N'-bis[2-(3,5-tert-butyl-4-hydroxyhydroxocinnamoyloxy)ethyl-[oxamide, and
   (d) a stabilizing amount of a hydroxylamine derivative of the formula

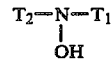

wherein $T_1$ is alkyl of 1 to 36 carbon atoms, cycloalkyl of 5 to 12 carbon atoms, aralkyl of 7 to 9 carbon atoms, or said aralkyl substituted by alkyl of 1 to 4 carbon atoms or by one or two halogen atoms, $T_2$ is hydrogen, or independently has the same meaning as $T_1$; and the carbon content of $T_1$ and $T_2$ together is 6 to 36 carbon atoms.

2. A composition according to claim 1 wherein component (a) is a polyolefin which is a homopolymer or copolymer of an alpha-olefin.

3. A composition according to claim 2 wherein the polyolefin is selected from the group consisting of polypropylene, low density polyethylene, medium density polyethylene, high density polyethylene, linear low density polyethylene, poly(butene-1), ethylene/vinyl acetate copolymer, ethylene/propylene copolymer, and copolymers of ethylene or of propylene with other alpha-olefins.

4. A composition according to claim 3 wherein the polyolefin is polypropylene, high density polyethylene, ethylene/propylene copolymer or a copolymer of ethylene or of propylene with another alpha-olefin.

5. A composition according to claim 1 wherein $T_2$ is hydrogen and $T_1$ is cycloalkyl of 6 to 12 carbon atoms; or $T_1$ and $T_2$ are the same and each are alkyl of 4 to 18 carbon atoms, cyclohexyl or benzyl.

6. A composition according to claim 5 wherein the hydroxyamine of formula I is N,N-di-tert-butylhydroxylamine, N,N-di-n-octylhydroxylamine, N-cyclohexylhydroxylamine, N-cyclododecylhydroxylamine, N,N- dicyclohexylhydroxylamine or N,N-dibenzylhydroxylamine, or a mixture thereof.

7. A composition according to claim 1 wherein the phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)-benzene, 1,3,5-tris-(3,5-di-tert-butyl-4-hydroxybenzyl)isocyanurate, 2,6-di-tert-butyl-p-cresol or 2,2'-ethylidene-bis(4,6-di-tert-butylphenol).

8. A composition according to claim 1 wherein the alkaline metal salt is calcium stearate, zinc stearate, magnesium behenate, sodium ricinoleate or potassium palmitate.

9. A composition according to claim 8 wherein the alkaline metal salt is calcium stearate.

10. A stabilized composition according to claim 1 which additionally contains
   (e) a stabilizing amount of an organic phosphorus compound, or mixture thereof, selected from the group consisting of tris(2,4-di-tert-butylphenyl) phosphite, 3,9-di(2,4-di-tert-butylphenoxy)-2,4,8,10-tetraoxa-3,9-diphospha [5.5]undecane, tris(p-nonylphenyl) phosphite, 3,9-distearyloxy-2,4,8,10-tetraoxa-3,9-diphospha[5.5]-undecane, dilauryl phosphite, 3,9-di[2,6-di-tert-buty-4-(2-(n-octadecyloxycarbonyl)ethyl)-phenoxyl]-2,4,8,10-tetraoxa-3,9-diphospha[5.5]undecane and tetrakis(2,4-di-tert-butylphenyl) 4,4'-bis(diphenylene)phosphonite.

11. A composition according to claim 10 wherein the organic phosphate compound is tris(2,4-di-tert-butylphenyl) phosphite.

12. A stabilized composition according to claim 1 which additionally contains
   (e) a stabilizing amount of a thiosynergist, or mixture thereof, selected from the group consisiting of dilauryl thiodipropionate, distearyl thiodiproprionate and neopentanetetrayl tetrakis(3-dodecylthiopropionate).

13. A composition according to claim 12 wherein the thiosynergist is dilauryl thiopropionate or distearyl thiodipropionate.

14. A stabilized composition according to claim 1 which additionally contains
   (e) a stabilizing amount of a hindered amine light stabilizer, or mixture thereof, selected from the group consisting of bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)-butylmalonate, tris-(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro- [5.1.11.2]-heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylene-bis(amino-2,2,-6,6-tetramethylpiperidine) and 1,2-dibromoethane, polycondensation product of 2,4-dichloro-6-morpholino-s-triazine and 4,4'-hexamethylenebis(amino-2,2,6,6-tetramethylpiperidine) N,N',N'',N'''-tetrakis[(4,6-bis(butyl-(2,2,6,6-tetramethylpiperidin-4-yl)amino)-s-triaxine-2-yl]-1,10-diamino-4,7-diazadecane, octamethylene bis(2,2,6,6-tetramethylpiperidin-4-carbosylate) and 4,4'-ethylenebis(2,2,6,-6-tetramethylpiperazine-3-one).

15. A composition according to claim 14 wherein the hindered amine light stabilizer is bis(2,2,6,6-tetramethylpiperidin-4-yl) sebacate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2,6,6-tetramethylpiperidine) or N,N',N'',N'''-tetrakis[4,6-bis(butyl-(2,2,6,6-tetramethylpiperidin-4-yl)amino)-s-triazin-2-yl]-1,10-diamino-4,7-diazadecane.

16. A stabilized composition according to claim 14 which additionally contains
   (f) a stabilizing amount of an organic phosphorus compound, or mixture thereof, selected from the group consisting of tris(2,4-di-tert-butylphenyl) phosphite, 3,9-di(2,4-di-tert-butylphenoxy)-2,4,8,10-tetraoxa-3,9-diphospha[5.5]undecane, tris(p-nonylphenyl) phosphite, 3,9-distearyloxy-2,4,8,10-tetraoxa-3,9-diphospha[5.5]undecane, dilauryl phosphite, 3,9-di[2,6-di-tert-butyl-4-(2-(n-octadecyloxycarbonyl)ethyl)-phenosyl]-2,4,8,10-tetraoxa-3,9,-diphospha[5.5]undecane and tetrakis(2,4-di-tert-butylphenyl) 4,4'-bis(diphenylene)phosphonite.

17. A composition according to claim 16 which additionally contains the organic phosphorus compound tris(2,4-di-tert-butylphenyl) phosphite.

* * * * *